United States Patent
Fisher et al.

(10) Patent No.: US 9,053,629 B2
(45) Date of Patent: Jun. 9, 2015

(54) CONTEXTUAL DATA DELIVERY TO MOBILE USERS RESPONSIVE TO ACCESS OF AN ELECTRONIC LOCKBOX

(71) Applicant: SentriLock, LLC, Cincinnati, OH (US)

(72) Inventors: Scott R. Fisher, West Chester, OH (US); Marcus D. Adams, Cincinnati, OH (US); Robert A. Bollas, Cincinnati, OH (US); Steve L. Caupp, Blue Ash, OH (US); Connie F. Carver, Blue Ash, OH (US); Kyle T. Etgen, Franklin, OH (US); Christopher A. Hunt, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 274 days.

(21) Appl. No.: 13/830,024

(22) Filed: Mar. 14, 2013

(65) Prior Publication Data

US 2014/0266586 A1    Sep. 18, 2014

(51) Int. Cl.
*G05B 19/00* (2006.01)
*G08C 17/02* (2006.01)
*H04W 12/06* (2009.01)
*E05B 19/00* (2006.01)
*G06Q 50/16* (2012.01)

(52) U.S. Cl.
CPC ............... *G08C 17/02* (2013.01); *H04W 12/06* (2013.01); *E05B 19/0005* (2013.01); *G06Q 50/16* (2013.01)

(58) Field of Classification Search
CPC ................. G07C 2009/00825; G07C 2209/08; E05B 19/0005; G06Q 50/16; H04W 12/06
See application file for complete search history.

(56) References Cited

U.S. PATENT DOCUMENTS

| | | |
|---|---|---|
| 5,654,696 A | 8/1997 | Barrett |
| 5,705,991 A | 1/1998 | Kniffin |
| 6,822,553 B1 | 11/2004 | Henderson |
| 6,842,105 B1 | 1/2005 | Henderson |
| 6,937,140 B1 | 8/2005 | Outslay |
| 7,177,819 B2 | 2/2007 | Muncaster |
| 7,606,558 B2 | 10/2009 | Despain |
| 7,880,584 B2 | 2/2011 | Larson |
| 8,040,218 B2 | 10/2011 | Hays |
| 2008/0246587 A1* | 10/2008 | Fisher .................... 340/5.73 |
| 2009/0153291 A1 | 6/2009 | Larson |
| 2011/0251876 A1* | 10/2011 | Fisher .................... 705/7.32 |

* cited by examiner

*Primary Examiner* — Steven Lim
*Assistant Examiner* — Omeed Alizada
(74) *Attorney, Agent, or Firm* — Frederick H. Gribbell

(57) ABSTRACT

An electronic lockbox sends identifying data to a portable communications device, which relays that data to a central computer, generating a response from the central computer containing customized information of special interest to the user. Such data can include information relating to the lockbox's property, and contextually relevant information relating to other similar properties nearby. Such data from the central computer also can be delivered to one more auxiliary portable communication devices, including such devices carried by individuals either in close proximity to the lockbox or at a remote location. The data also could comprise visitation history relevant to the user, allowing an agent or a prospect to review information about previous visits to properties. The central computer can also query a user to provide location information for a lockbox that has been added to the system database.

26 Claims, 9 Drawing Sheets

CONTEXTUAL DATA DELIVERY TO MOBILE USERS RESPONSIVE TO ACCESS OF AN ELECTRONIC LOCKBOX

TECHNICAL FIELD

The technology disclosed herein relates generally to electronic locks and electronic lockbox systems and is particularly directed to a system of the type that includes a portable communications device (sometimes referred to herein as a portable transponder) that communicates with an electronic lockbox using a low power radio link. Embodiments are specifically disclosed as a portable communications device that includes both a low power radio to communicate to the lockbox and a wide area network radio to communicate to a central clearinghouse computer, and optionally includes a Global Positioning System (GPS) receiver to determine approximate physical location of the lockbox when in communication with the lockbox.

In some disclosed embodiments, the portable transponder includes a motion sensor to activate its wide area network radio; also disclosed is a portable transponder that includes a smart card connector to communicate with a secure memory device.

A further embodiment is disclosed involving the portable communications device that communicates to an electronic lockbox using a low power radio and that communicates to a central clearinghouse computer using a wide area network radio; this portable communications device also provides a secondary computer to receive messages from the clearinghouse computer over the wide area network. In more advanced applications, the portable communications device can comprise a smart phone, which can run application software programs (called "APPS"), to customize the functions executed by the smart phone, and to allow certain information residing on the central computer to be displayed on the smart phone.

Embodiments are also disclosed as a system having an electronic lockbox that sends identifying data to the portable communications device via a low power radio and relays that data to the central clearinghouse computer, and generating a response from the central clearinghouse computer that contains one or more data elements with customized information of special interest to the user of the portable communications device. Such data elements can include information relating to the property to which the electronic lockbox is attached, and/or data relating to other similar properties in the geographic area. The data elements also could comprise configuration data relevant to the electronic lockbox, thereby updating the lockbox remotely and updating diagnostic data for the lockbox that allows near real time diagnostics from a support center located remote to the lockbox. Data from the central clearinghouse computer responsive to the lockbox being accessed also can be delivered to one more auxiliary portable communication devices, include such devices carried by individuals either in close proximity to the lockbox or at a remote location.

STATEMENT REGARDING FEDERALLY SPONSORED RESEARCH OR DEVELOPMENT

None.

BACKGROUND

As wireless communication systems have become more prevalent, the ability to deliver relevant information to an end user in near real time is possible. With the vast amount of information being created and updated moment by moment, intelligent systems responsive to situational data needs are highly desirable. In the real estate industry for example, properties go on and off the market regularly, prices change, and surrounding similar properties may be of interest to a prospective home buyer.

In most real estate transactions, there are three to four parties involved in completing the transaction—the buyer, the seller, the buyer's agent or representative, and the seller's agent or representative. (Sometimes the two agents comprise a single person.) An event of showing a seller's property to a prospective buyer generates an electronic event at the lockbox, when one of the above mentioned agents accesses the lockbox to retrieve the key to the property. This access event itself identifies the buyer's interest in properties of a type similar to the property being visited, the geographic location of the property, and level of interest potentially inferred by the length of the visit. Access events recorded over time provide additional data relevant to general interest in the subject property, which may be reflective of price or property condition.

SUMMARY

Accordingly, it is an advantage to provide an electronic lockbox system in which data can be delivered to a user in real time, in which the user requests contextual data that is relevant to a particular geographic location of the lockbox that is being accessed by that user; the central computer searches its database for other relevant properties and creates a data set that is sent to the user in real time, so that the user can review the contextual data almost immediately, and also enables the user to discuss that contextual data with a sales prospect during a meeting that is occurring in real time.

It is another advantage to provide an electronic lockbox system that allows the central computer to identify a lockbox being accessed by a user who has an electronic key and is communicating with the central computer, essentially in real time; the central computer can determine if that lockbox has been associated with a particular property that is already stored in the database of the central computer, and if not, will query the user of the electronic key, asking for appropriate location information, which quickly updates the database of the central computer with up to date information about that lockbox and its associated property.

It is yet another advantage to provide an electronic lockbox system that allows the central computer to automatically match a sales agent with a sales prospect in near real time, by receiving messages from both persons that include GPS location data; if the central computer can correlate two separate messages with GPS location data and thereby match the locations of those two persons, the central computer can create a new entry in the database for this match and can record a visit to the property into a separate history database for later use.

It is still another advantage to provide an electronic lockbox system that allows a central computer to be accessed by sales agents and sales prospects, and to provide a history of previous property visits by such a sales agent or a sales prospect; both sales agents and sales prospects can access a special database in the central computer that allows such persons to view a history of their individual property visits and to review details of those property visits while, typically using the Internet for such access.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a method for operating an electronic lockbox system is provided, in which the method comprises the following steps: (a) providing an electronic lockbox having a first processing circuit, a first memory circuit, a first short range wireless communications circuit, and a secure compartment having a movable opening element that is under the control of the first processing circuit; (b) providing at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; (c) providing a central computer having a third processing circuit, a third memory circuit containing at least one database, and a second WAN communications circuit for communicating with the wide area network; (d) in response to a communication event occurring between the electronic lockbox and the first portable communications device, sending, by use of the first WAN communications circuit, an indication of such communication event to the central computer; (e) at the central computer, assimilating a data set of contextually relevant information relating to a property to which the lockbox is assigned; and (f) sending, by use of the second WAN communications circuit, at least one data element from the data set to the at least one portable communications device.

In accordance with another aspect, an electronic lockbox system is provided, which comprises: (a) an electronic lockbox having a first processing circuit, a first memory circuit, a first short range wireless communications circuit, and a secure compartment having a movable opening element that is under the control of the first processing circuit; (b) at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; and (c) a central computer having a third processing circuit, a third memory circuit containing at least one database, and a second WAN communications circuit for communicating with the wide area network; wherein the first, second, and third processing circuits are configured: (d) in response to a communication event occurring between the electronic lockbox and the first portable communications device, to send, by use of the first WAN communications circuit, an indication of such communication event to the central computer; (e) at the central computer, to assimilate a data set of contextually relevant information relating to a property to which the lockbox is assigned; and (f) to send, by use of the second WAN communications circuit, at least one data element from the data set to the at least one portable communications device.

In accordance with yet another aspect, a method for operating an electronic lockbox system is provided, in which the method comprises the following steps: (a) providing an electronic lockbox having a first processing circuit, a first memory circuit, a first short range wireless communications circuit, and a secure compartment having a movable opening element that is under the control of the first processing circuit; (b) providing a plurality of portable communications devices, including a first portable communications device of the plurality of portable communications devices, the first portable communications device having a second processing circuit, a second memory circuit, a display, a data entry device, a GPS receiver, a second short range wireless communications circuit, and a first WAN communications circuit for communicating with a wide area network; (c) providing a central computer having a third processing circuit, a third memory circuit containing at least one database, and a second WAN communications circuit for communicating with the wide area network; (d) establishing a first database in the third memory circuit of the central computer, the first database used for containing relationship information between agents and prospects; (e) sending, using the first WAN communications circuit, a message from the first portable communications device to the central computer, the message including GPS location data; and (f) updating the first database in the central computer, based on a proximal GPS location of the first portable communications device substantially at a time when the first portable communications device communicates with the electronic lockbox.

In accordance with still another aspect, an electronic lockbox system is provided, which comprises: (a) an electronic lockbox having a first processing circuit, a first memory circuit, a first short range wireless communications circuit, and a secure compartment having a movable opening element that is under the control of the first processing circuit; (b) a plurality of portable communications devices, including a first portable communications device of the plurality of portable communications devices, the first portable communications device having a second processing circuit, a second memory circuit, a display, a data entry device, a GPS receiver, a second short range wireless communications circuit, and a first WAN communications circuit for communicating with a wide area network; and (c) a central computer having a third processing circuit, a third memory circuit containing at least one database, and a second WAN communications circuit for communicating with the wide area network; wherein the first, second, and third processing circuits are configured: (d) to establish a first database in the third memory circuit of the central computer, the first database used for containing relationship information between agents and prospects; (e) to send, using the first WAN communications circuit, a message from the first portable communications device to the central computer, the message including GPS location data; and (f) to update the first database in the central computer, based on a proximal GPS location of the first portable communications device substantially at a time when the first portable communications device communicates with the electronic lockbox.

In accordance with a further aspect, a method for operating an electronic lockbox system is provided, in which the method comprises the following steps: (a) providing an electronic lockbox having a first processing circuit, a first memory circuit, a first short range wireless communications circuit, and a secure compartment having a movable opening element that is under the control of the first processing circuit; (b) providing at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; (c) providing a central computer having a third processing circuit, a third memory circuit containing at least one database, and a second WAN communications circuit for communicating with the wide area network, and a network server; (d) interacting with the electronic lockbox by the first portable communications device, by using the first and second short range wireless communications circuits; (e) sending a message from the first portable communications device to the central computer, using the first and second WAN communications circuits, informing the central computer of the interaction between the electronic lockbox and the first portable communications device; (f) at the central computer, identifying the electronic lockbox that was interacted with by a user of the first portable communications device; and (g) at the central computer, determining if the identified lockbox is associated with a property in the at least one database of the central computer, and if not so associated, then: (h) querying the user of the first portable communications device for at least one of: an address, and a location, of the electronic lockbox.

In accordance with a yet further aspect, an electronic lockbox system is provided, which comprises: (a) an electronic lockbox having a first processing circuit, a first memory circuit, a first short range wireless communications circuit, and a secure compartment having a movable opening element that is under the control of the first processing circuit; (b) at least one portable communications device, including a first portable communications device of the at least one portable communications device, the first portable communications device having a second processing circuit, a second memory circuit, a display, a data entry device, a second short range wireless communications circuit, and a first WAN communications circuit for communicating with a wide area network; and (c) a central computer having a third processing circuit, a third memory circuit containing at least one database, and a second WAN communications circuit for communicating with the wide area network, and a network server; wherein the first, second, and third processing circuits are configured: (d) to interact with the electronic lockbox by the first portable communications device, by using the first and second short range wireless communications circuits; (e) to send a message from the first portable communications device to the central computer, using the first and second WAN communications circuits, informing the central computer of the interaction between the electronic lockbox and the first portable communications device; (f) at the central computer, to identify the electronic lockbox that was interacted with by a user of the first portable communications device; and (g) at the central computer, to determine if the identified lockbox is associated with a property in the at least one database of the central computer, and if not so associated, then: (h) to query the user of the first portable communications device for at least one of: an address, and a location, of the electronic lockbox.

In accordance with a still further aspect, a method for operating an electronic lockbox system is provided, in which the method comprises the following steps: (a) providing a plurality of electronic lockboxes, including a first electronic lockbox of the plurality of electronic lockboxes, the first electronic lockbox having a first processing circuit, a first memory circuit, and a secure compartment having a movable opening element that is under the control of the first processing circuit; (b) providing at least one portable communications device, including a first portable communications device of the at least one portable communications device, the first portable communications device having a second processing circuit, a second memory circuit, a display, a data entry device, and a first WAN communications circuit for communicating with a wide area network; and (c) providing a central computer having a third processing circuit, a third memory circuit containing at least one database, and a second WAN communications circuit for communicating with the wide area network, wherein the at least one database includes a first database having a plurality of entries that record information about visits to at least one property in the electronic lockbox system; (d) sending login message information from the first portable communications device to the central computer; (e) at the central computer, determining if the login message information is correct, and if so, allowing a user of the first portable communications device to obtain access to predetermined portions of the at least one database; (f) upon request by the user, sending a history of at least one property visit at the plurality of electronic lockboxes involving the user, from the central computer to the first portable communications device, and displaying the history on the display of the first portable communications device; (g) allowing the user, by use of the data entry device of the first portable communications device, to select one of the property visits from the history of at least one property visit, and sending that selection to the central computer; and (h) sending relevant information about the selected property visit from the central computer to the first portable communications device.

In accordance with yet another aspect, an electronic lockbox system is provided, which comprises: (a) a plurality of electronic lockboxes, including a first electronic lockbox of the plurality of electronic lockboxes, the first electronic lockbox having a first processing circuit, a first memory circuit, and a secure compartment having a movable opening element that is under the control of the first processing circuit; (b) at least one portable communications device, including a first portable communications device of the at least one portable communications device, the first portable communications device having a second processing circuit, a second memory circuit, a display, a data entry device, and a first WAN communications circuit for communicating with a wide area network; and (c) a central computer having a third processing circuit, a third memory circuit containing at least one database, and a second WAN communications circuit for communicating with the wide area network, wherein the at least one database includes a first database having a plurality of entries that record information about visits to at least one property in the electronic lockbox system; wherein the first, second, and third processing circuits are configured: (d) to send login message information from the first portable communications device to the central computer; (e) at the central computer, to determine if the login message information is correct, and if so, to allow a user of the first portable communications device to obtain access to predetermined portions of the at least one database; (f) upon request by the user, to send a history of at least one property visit at the plurality of electronic lockboxes involving the user, from the central computer to the first portable communications device, and to display the history on the display of the first portable communications device; (g) to allow the user, by use of the data entry device of the first portable communications device, to select one of the property visits from the history of at least one property visit, and then to send that selection to the central computer; and (h) to send relevant information about the selected property visit from the central computer to the first portable communications device.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
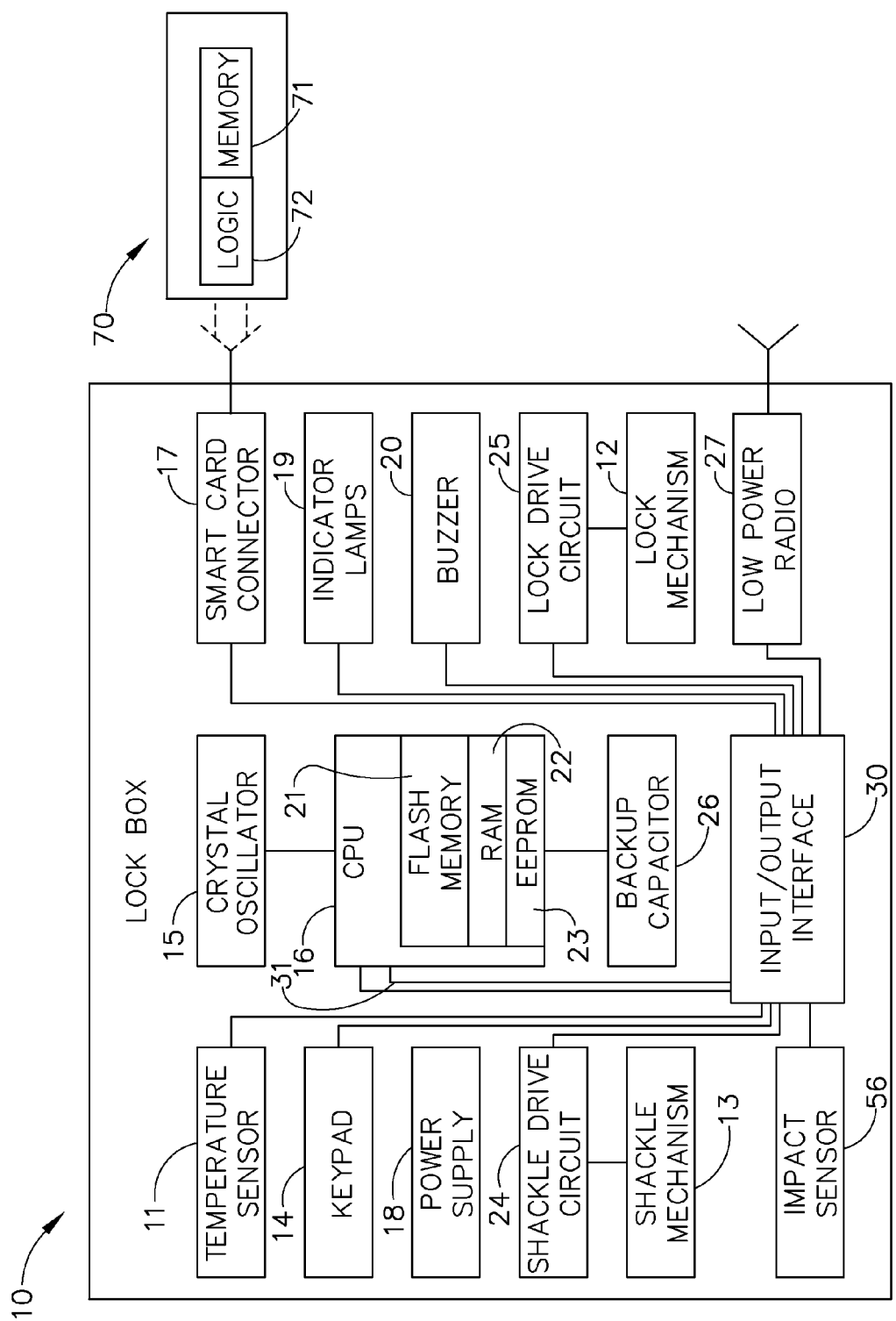
FIG. 1 is a schematic block diagram of the electrical components of an electronic lockbox, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

The system described herein provides near real time delivery of relevant information on properties to which the lockbox is attached and those that may be of reasonable interest to the user. The automated delivery of this information saves substantial time for the user as well as data transmission cost since a lengthy process of searching for the relevant information on-line is not as fast as the central clearinghouse computer actively sending contextual information based on situational data relayed from the user. In addition, data delivered to more than one information consumer may be desirable. For example, an individual looking to purchase a home may wish to receive information on the property visited that may not be readily available on site when visiting the property, such as property tax information. Additionally, that prospective home buyer may wish to have additional data delivered for similar properties in the area such that a more efficient physical search for homes may be performed. Yet another desirable feature is to automatically track visited properties and display those locations on a map. Home buyers would also benefit from knowing the level of interest in a subject property based on visits; home sellers also could use visit information in the context of comparable properties to better understand barriers to sale, such as price, curb appeal, or amenities. Automation of these tasks provides convenience for all of the parties in the transaction.

This system also enables data delivered to the seller's smart phone to be uploaded into the lockbox, thereby enabling a listing agent to effect changes to lockbox settings remotely when the seller is in close proximity to the lockbox.

The system in some embodiments utilizes information garnered from a GPS receiver associated with either the lockbox or the portable communication device, wherein GPS specifies general global positioning information regardless of the actual methodology or system used to ascertain geographic position.

This description will begin with an overview description of some of the features of the technology disclosed herein. It should be noted that a co-pending patent application by the same inventor is incorporated by reference herein; that document is application Ser. No. 12/883,628, filed on Sep. 16, 2010, titled "ELECTRONIC LOCK BOX PROXIMITY ACCESS CONTROL," which describes in detail many of the hardware elements of this system.

Setup

Each user in the system installs application software (known as an "APP") on their portable communications device (e.g., a portable transponder, electronic key, or a smart phone that includes a GPS receiver) that communicates with the central clearing house computer (CCC) over the wide area network (WAN). The application (APP) identifies itself to the CCC via user login credentials and can remain active on the user's portable communication device to receive notifications and data from the CCC in near real time (assuming the portable device is in communication range with a cellular tower, or other type of communications node). The application on the portable communication device relies on GPS information to determine when it is appropriate to send data to the user's device based on the activity of the user's agent or representative. Most real estate agents have multiple clients, therefore the CCC must be able to track which client the agent is working with at the time to send the proper data to users of the system. In the case of seller's agents being matched with sellers, the system utilizes the location of the lockbox, whether pre-assigned by the seller's agent in the CCC database or by GPS information collected through accesses of one or more buyers agents. For buyer's agents, the CCC identifies both the buyer's agent and the buyer by matching their respective GPS locations and times corresponding to access events at the lockbox. That is, the buyer would obviously be present at the physical location with the buyer's agent during the process of a home showing; therefore, both would have GPS locations that are proximally close to one another. The method of relationship identification discussed above requires little if any user intervention. It should be noted that one or more buyers or sellers can be automatically associated with their respective representative, e.g., a husband and wife desiring data notifications responsive to events at the lockbox. Once the relationship is determined by the CCC, future data can be pushed to multiple portable communication devices even if only one participant is present at the showing.

Buyer Relevant Data Communication Responsive to Lockbox Events

At the time of lockbox access, the portable communication device receives the identity of the lockbox being accessed via the low power radio link and augments this information with GPS location data provided either by the lockbox itself or by the portable communication device. If the portable communication device is within communication range of the wide area network (WAN), the access event data is relayed to the central clearinghouse computer (CCC). Software resident on the CCC computer system identifies the real estate listing information based on a pre-assigned lockbox serial number corresponding to the listing or by using the GPS coordinates communicated as part of the transmission. Once the subject property is identified, attributes about the subject property, such as price range, neighborhood, number of bedrooms, approximate square footage, are known by the system and can be attributed to a specific buyer for further processing. The activity of the buyer visiting the subject property is stored in the CCC to automatically maintain a record of which properties have been visited. Data messages corresponding to duplicate visits are identified by the CCC and filtered, so as not to send redundant contextual information to the buyer.

The CCC then evaluates other properties in its database to identify other potential properties in a specific geographic range that have similar characteristics to the subject property. Without user intervention, the CCC assembles a data set of desirable like properties and transmits them to the portable communication device as quickly as possible. The software application (APP) on the portable communication device displays this information in near real time, thereby allowing the buyer to identify other properties in the area that may be of interest as well as a map of properties already visited. The application (APP) on the portable communication device allows the buyer to see listing information on the CCC-generated list of properties and to mark off properties which are not of interest. Status changes on desirability entered by the buyer are communicated back to the CCC, so the database maintained of buyer preferences and activity is updated.

It should be noted that any relevant contextual data can be sent to the portable communication device. Such data could include: property tax information, EPA hazardous waste sites, school district information, local merchant information, advertising or other special offers, and the like.

Another feature of the system includes storing photos or videos taken by the buyer or their agent of the subject property; such data can be stored on the CCC for future reference. This is especially useful when a large number of properties are visited and it becomes difficult to remember which property had specific attributes.

Buyer's Agent Relevant Data Communication Responsive to Lockbox Events

The information sets described above are also useful to the buyer's agent, and delivery of such information can occur nearly simultaneously on multiple portable communication devices carried by the buyer and the buyer's agent.

At the time of access, the buyer's agent can benefit from real time contextual information about the listing. Such information includes, for example, alarm system information such as a disarm code that should not be generally shared, even with the buyer; and other important information such as "dog locked in garage;" these are examples of such time sensitive information. Certain of these messages are critical in nature and should not be disregarded by the buyer's agent. To prevent accidentally ignoring these messages, an alert can be generated by the lockbox or by the portable communication device indicating such a message is present. As an insurance step, these messages can be flagged such that, for example, an additional code is required at the lockbox, or an acknowledgement of the message is made on the smart phone prior to enabling lockbox access.

Another feature simplifying the management of real estate clients is providing a feature by which the buyer's agent has a software application (an "APP") that receives information for tracking which exact properties have been visited by the client (e.g., a "buyer"), as well as additional information relating to other prospective properties in the area that may be of interest to the buyer.

Seller Relevant Data Communication Responsive to Lockbox Events

Property sellers are usually lacking in terms of real time updates and feedback during the sale of their property. Events triggered by accessing the lockbox on the seller's property, coupled with neighborhood statistical data on like property accesses, can be of great benefit to the seller. The automated nature of this reporting lessens the burden on the listing agent, as the seller is kept notified throughout the sales process.

As described above, at the time of lockbox access, the portable communication device receives the identity of the lockbox being accessed via the low power radio link, and augments this information with GPS location data provided either by the lockbox itself or by the portable communication device. If the portable communication device is within communication range of a wide area network (WAN), the access event data is quickly relayed to the central clearing house computer (CCC). Software resident on the CCC computer system identifies the real estate listing information based a on pre-assigned lockbox serial number corresponding to the listing, or by using the GPS coordinates that are communicated as part of the transmission.

The CCC then evaluates the other properties in its database to identify other properties in a specific geographic range that have similar characteristics to the seller's property. Without user intervention, the CCC assembles a data set of statistics regarding access to the list of like properties, and transmits that information to the portable communication device, as requested by the user of the portable communication device. The software application (the "APP") on the portable communication device displays this information in near real time, allowing the seller to understand the relative showing activity in the surrounding area for similar properties.

Other data that would benefit the seller, relating to lockbox access, may include showing event start, showing completion, access of the lockbox by a minor or other family member through a "latchkey" mode on the lockbox, and notification if the key was not returned to the lockbox. Some of these features are more fully taught in earlier patent application Ser. No. 12/883,628 and U.S. Pat. No. 7,999,656, by the present inventor, which are incorporated herein by reference in their entirety—see below.

Crowd Sourced Lockbox to Property Database Linkage

Given the high reliance on identifying which lockbox is attached to a specific property, a method of using multiple input sources to correlate the identity of the lockbox on the property is desired. In situations where the seller's agent fails to assign the lockbox serial number in the CCC database, which would identify which lockbox is assigned to a specific property, a "crowd sourced" approach may be used to effect assignment. In that circumstance, during an access event to a specific lockbox that has not yet been assigned to a property listing in the CCC database, each portable communication device user (e.g., a buyer's agent) would receive a message from the CCC requesting the street address information for the property being shown. The buyer's agent would be required to answer the query, otherwise his/her portable communication device would be restricted from interacting with future lockboxes until the query is answered. The CCC would store the responses and statistically correlate such responses where matches occur, thereby allowing the CCC to identify the property to which the lockbox is assigned.

Lockbox Settings Update Via Seller's Portable Communication Device

There are occasions in which the seller or seller's agent needs to modify the settings of the lockbox. For example, a "pending" sale contract status may make it desirable to lock out further showings by prospective buyer's agents. Such updating of the lockbox traditionally required the seller's agent to visit the property to effect a change in settings for that lockbox. This is often inconvenient and somewhat costly, depending on the distance the seller's agent must travel, plus it does not provide the potential immediate needs of the seller. The system described herein allows the seller's agent, or an authorized representative, to place data in the CCC that is transferred to the seller's portable communication device. The seller can then initiate communication between the lockbox and his/her portable communication device such that the lockbox receives data relating to the new settings. This data stream can include a command that changes the status setting, for example.

Central Clearinghouse Computer

Terminology herein relating to the central clearinghouse computer (CCC) should be understood to encompass one or more physical computers, either together at a single location, or computers that are geographically diverse but that work in concert with one another, to store, retrieve, and otherwise process information relevant to operation of the "system." In today's computing parlance, "the cloud" is one possible representation of a computing platform equivalent to that carried out by the CCC in this disclosure. In this technical field, the CCC is sometimes referred to herein as a "central computer" or a "clearinghouse computer."

The CCC will include memory storage devices that can hold one or more databases of information; usually one of the databases is updated with new information almost every time a sales agent or a sales prospect communicates with the CCC, under the control of the operating software of the CCC itself. In some applications, as described below, a new database is "started" in the memory of the CCC by certain types of communications and transactions that are initiated by a sales agent or prospect. In many descriptions of this type of equipment, the "database" of the CCC actually represents multiple individual database structures, when viewed from a computer science standpoint—and these are often "relational databases" at that. However, the existence of several database structures is still referred to as a singular tense "database" at times, even though it is understood that a single huge database really comprises more than one type of store of information at the CCC.

As noted above, the secondary computer device (or the portable communications device) would typically be a wireless device, such as a smart phone. It also could be a wireless laptop computer, if desired by the user. In some embodiments, this device may include a GPS receiver, as described below in greater detail.

Referring now to the drawings, FIG. 1 illustrates an exemplary embodiment of an electronic lockbox generally designated by the reference numeral 10, which is suitable for use with the technology disclosed herein. Lockbox 10 has an outer housing, which includes a keypad 14 (see FIG. 2), and the housing includes a movable key compartment door 32 (see FIG. 2). The upper housing of lockbox 10 includes two receptacles (not shown) that receive a shackle 40 (see FIG. 2).

The shackle 40 has an upper portion 46 and two shackle extensions (not visible in FIG. 2) that fit through the receptacles. It should be noted that the keypad 14 may also be referred to as a "data input device," in which a human user may press one or more of the keys to enter data, such as numeric information.

The electronic circuitry of electronic lockbox 10 is illustrated in block diagram form in FIG. 1. In this illustrated embodiment, electronic lockbox 10 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. An impact sensor 56 can also be included in electronic lockbox 10, to detect abnormal mechanical forces that might be applied to the device.

An input/output (I/O) interface circuit 30 is included to provide signal conditioning as needed between the CPU 16 and other components that typically use voltage and/or current levels that are not typically able to hook up directly to a processing device, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 is included in this embodiment so that the CPU 16 is able to communicate with other external devices, such as a separate portable transponder 100 (see FIG. 2) that uses a compatible wireless data link. (The portable transponder can also be referred to as a "portable communications device," an "electronic key," or a "smart phone" in some embodiments of this technology.) The portable transponder 100 also includes a low power radio 127, which communicates with radio 27 using a protocol that could be proprietary, if desired. However, the radios 27 and 127 could use any number of various communications protocols, such as BlueTooth, although the data structure in the messages between radios 27 and 127 certainly could be encrypted, or otherwise formatted in a proprietary manner. Radios 27 and 127 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

Microprocessor 16 controls the operation of the electronic lockbox 10 according to programmed instructions (electronic lockbox control software) stored in a memory device, such as in FLASH memory 21. RAM memory 22 is typically used to store various data elements such as counters, software variables and other informational data. EEPROM memory 23 is typically used to store more permanent electronic lockbox data such as serial number, configuration information, and other important data. It will be understood that many different types of microprocessors or microcontrollers could be used in the electronic lockbox system 10, and that many different types of memory devices could be used to store data in both volatile and non-volatile form, without departing from the principles disclosed herein. In one mode of an exemplary embodiment, the electronic lockbox CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lockbox. Capacitor 26 is used to provide temporary memory retention power during replacement of battery 18. It will be understood that an alternative electrical power supply could be used if desired, such as a solar panel with the memory backup capacitor.

As noted above, electronic lockbox 10 includes a shackle 40 that is typically used to attach the box 10 to a door handle or other fixed object. Electronic lockbox 10 also includes a key compartment which typically holds a dwelling key (not shown), and which can be accessed via the key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electro-mechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on a "smart card" 70 to allow the exchange of data between the electronic lockbox's CPU 26 and memory devices 71 in the smart card 70 (discussed below in greater detail). The smart card 70 itself typically will include some control logic circuits 72, to prevent "easy" or unauthorized access to the memory elements 71 on-board the card 70.

It should be noted that an electronic key (such as that described above) could be used as a type of secure memory device for the element at reference numeral 70, rather that a classic "smart card." Such an electronic key would also contain memory elements 71, and perhaps would contain some control logic circuits 72, although the control logic circuits might be optional, depending on the type of electronic key device that is used. With regard to FIG. 1, if an electronic key is used, it could be interfaced to the CPU circuit 16 of the electronic lockbox 10 is many different ways, including via an electrical circuit that makes contact between the lockbox 10 and the electronic key 70 (similar to that depicted on FIG. 1), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer or a smart phone that has a wireless communications circuit to send and receive messages from other devices, including an electronic lockbox and/or a central clearinghouse computer. A "typical" electronic key will generally be a more sophisticated device.

In one embodiment, the digital temperature sensor 11 is read at regular intervals by the electronic lockbox CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lockbox operating environment temperature. As noted above, a single chip can be used to replace the combination of crystal oscillator 15 and temperature sensor 11, such as a part number DS32KHZ manufactured by Dallas Semiconductor.

The LED indicator lamps 19 and piezo buzzer 20 are included to provide both an audible and a visual feedback of operational status of the electronic lockbox 10. Their specific uses are described in detail in other patent documents by the same inventor, as noted below.

The impact sensor 56 can be used to notify an external device, in case of an attempted removal or other type of damage being done to the lockbox 10, including intentional damage. Such an external device could comprise a "base station" as described in detail in other patent documents by the same inventor, or it could comprise the portable transponder 100 that is described herein.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 2:
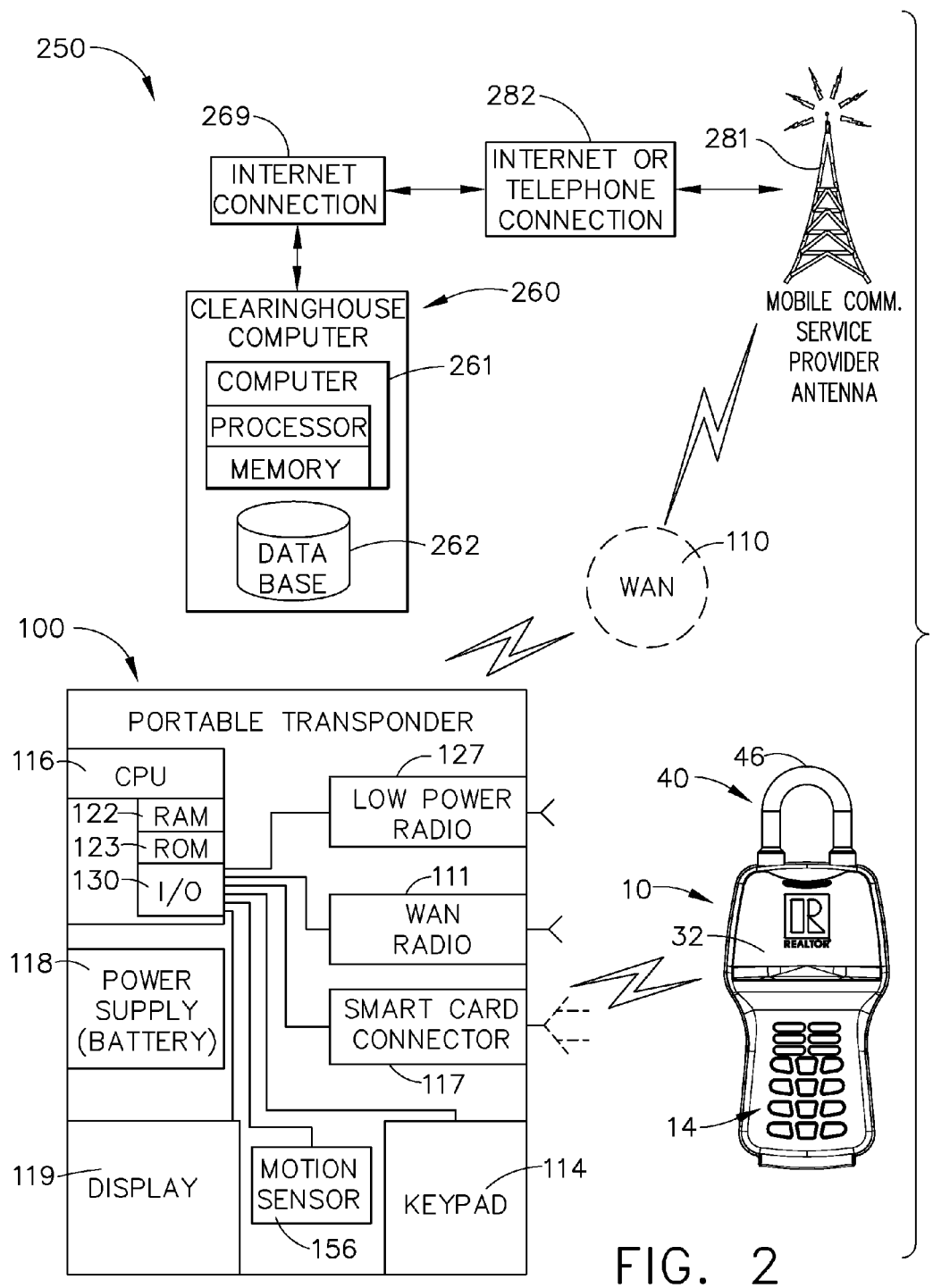
FIG. 2 is a diagrammatic view of the major components of a first embodiment of an electronic lockbox security system, including a central computer station, a wireless portable transponder device, and a portable electronic lockbox apparatus such as that depicted in FIG. 1.

Referring now to FIG. 2, a first embodiment electronic lockbox system, generally designated by the reference numeral 250, is depicted. The system 250 includes one or more electronic lockboxes 10, perhaps one or more secure memory cards (not shown on FIG. 2), portable transponder devices 100, a central clearinghouse computer system 260 (also sometimes referred to herein as a "CCC"), and a wireless data communications system, represented by Internet® connections 269 and 282, and a mobile phone provider 281. The central clearinghouse computer 260 typically will include a database 262 which contains a repository of electronic lockbox identification and attribute information, and also contains a repository of information about real estate agents. A computer 261 controls the database 262, and includes a processing circuit and a memory circuit (in addition to any bulk memory storage devices that contain the database 262).

Referring now to FIG. 2, an electronic lockbox system of a first embodiment is depicted in a diagrammatic view. An electronic lockbox 10 is depicted in the lower-right corner of FIG. 2, and is shown communicating to a portable transponder 100. As discussed above, portable transponder 100 includes a low power radio 127 that can communicate data to and from the low power radio 27 of the electronic lockbox 10. Some of the other components of the portable transponder 100 are depicted on FIG. 2.

In this embodiment, portable transponder 100 includes a microprocessor (CPU) 116, random access memory (RAM) 122, read only memory (ROM) 123, and an input/output interface circuit 130. There are several devices that are in communication with the input/output (I/O) circuit 130, as discussed immediately below.

The low power radio 127 communicates data to and from the CPU 116, via the I/O circuit 130. A wide area network (WAN) radio 111 is provided, and it also communicates data to and from the CPU 116, via the I/O interface circuit 130. Portable transponder 100 also includes a smart card connector 117, which is essentially identical to the smart card connector 17 that is provided on the electronic lockbox 10. Portable transponder 100 also includes a display 119, a keypad 114, a power supply 118 (typically a battery), and a motion sensor 156. The motion sensor 156 provides additional capability for the portable transponder 100, as discussed in greater detail below.

Because of its wide area network radio 111, portable transponder 100 is able to communicate to the clearinghouse computer 260 over a wide area network (WAN), which is generally designated by the reference numeral 110. Assuming that the mobile communications service provider 281 is a cellular telephone system, the portable transponder 100 will have the capability of essentially immediate communications with the clearinghouse computer 260 from many, many locations, including most locations where an electronic lockbox 10 has been situated. On the other hand, if a particular electronic lockbox 10 is located in a very remote area, where there is no cellular telephone connection coverage, then the wide area network 110 therefore would not reach that location, and the portable transponder 100 would not be in immediate communication with the clearinghouse computer 260. This situation will be discussed below in greater detail.

The wide area network radio 111 further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications device," or as a "medium range wireless communications device."

In a preferred mode of the first embodiment depicted on FIG. 2, the portable transponder 100 includes a connector 117 that is capable of accepting a secure memory card (such as a "smart card"), so that a user who typically connects his or her secure memory card directly to an electronic lockbox 10 will also be able to connect the same secure memory card to the portable transponder 100, and have much the same results. This will be described in greater detail below. Note that the smart card connector can also be referred to as a "data interface" that communicates with a "secure memory device"—a "smart card" is an example of a secure memory device.

The first radio circuit of the portable transponder is the low power radio 127 such as Atmel's AT86RF23x series that uses a low power radio frequency signal. The portable transponder also includes a second radio circuit which is capable of longer range communications for wide area network connectivity, such as Wavecom's WISMO22x series. In a preferred embodiment, the CPU 116 will comprise a low power microcontroller, and a relatively low power visual display 119 will be provided to allow indication of operating status. The motion sensor 156 is to be included as an internal motion sensor that is coupled to the microcontroller (CPU 116). Its capability and use is described below.

The low power communications circuit in the lockbox (e.g. low power radio 27) provides sufficient range to enable proximal communications with a portable transponder 100 that is carried by the lockbox system user. The built in wide area communication radio of the transponder (e.g., WAN radio 111), such as radios used by a cellular carrier, enables a host of other system features. One desirable feature of this arrangement is for individuals who access an electronic lockbox to be unencumbered with other devices. For example, real estate agents often have their hands full when approaching a lockbox, and such an agent that is equipped with a portable transponder 100 can enter a personal identification code on the keypad 114 of the portable transponder 100. It should be noted that the keypad 114 may also be referred to as a "data input device," in which a user (e.g., a sales "agent") may press one or more of the keys to enter data, such as numeric information.

Such an agent could initially use the portable transponder and its keypad while remaining in a vehicle, for example, and inserting their secure memory card into the connector 117 of the portable transponder 100. In this mode, the agent can prepare his or her portable transponder to be ready to communicate his or her personal identification code from the transponder 100 to the lockbox 10 over the low power radio link (between radios 127 and 27), and the electronic lockbox will interpret that radio signal to allow access to the key compartment door 32. In this manner, the lockbox radio system retrieves data from the portable transponder 100 to facilitate access to the dwelling key that is contained within the secure compartment of the electronic lockbox 10.

In another operating mode, a secure memory card that is connected to smart card connector 117 of the portable transponder 100 can have data read from the memory elements of the secure memory card 70 that is connected to the portable transponder 100, and have that data sent to the electronic lockbox over the low power radio link, thereby having the secure memory card's data "read" by the electronic lockbox CPU 16. Furthermore, if it is desirable to write data onto the memory elements 71 of a secure memory card 70, that function can occur while the secure memory card is connected to the smart card connector 117 of the portable transponder 100, by having the low power radio 27 of the electronic lockbox 10 transfer data to the portable transponder 100, and the CPU 116 can then write data onto the secure memory card, via the smart card connector 117. This could be accomplished to write the same types of data that would otherwise be written directly by the lockbox 10 to the secure memory card 70 as it is connected into the smart card connector 17 of the lockbox itself.

The use of secure memory cards offer many advantages with the electronic lockbox system for access to the lockbox, which is well documented in previous patents and patent applications filed by the same inventor of this patent document. To further enhance security, the lockbox can use data that the portable transponder 100 has retrieved over its wide area radio system (i.e., the WAN 110), such as the current (real time) decryption key for use with the secure memory card. If the portable transponder loses contact with the central clearinghouse computer system 260, or if the secure memory card is either lost or stolen, the decryption key update credentials of the portable transponder can be revoked at the central clearinghouse computer, thereby disabling further access to lockboxes by that secure memory card.

Figure 3:
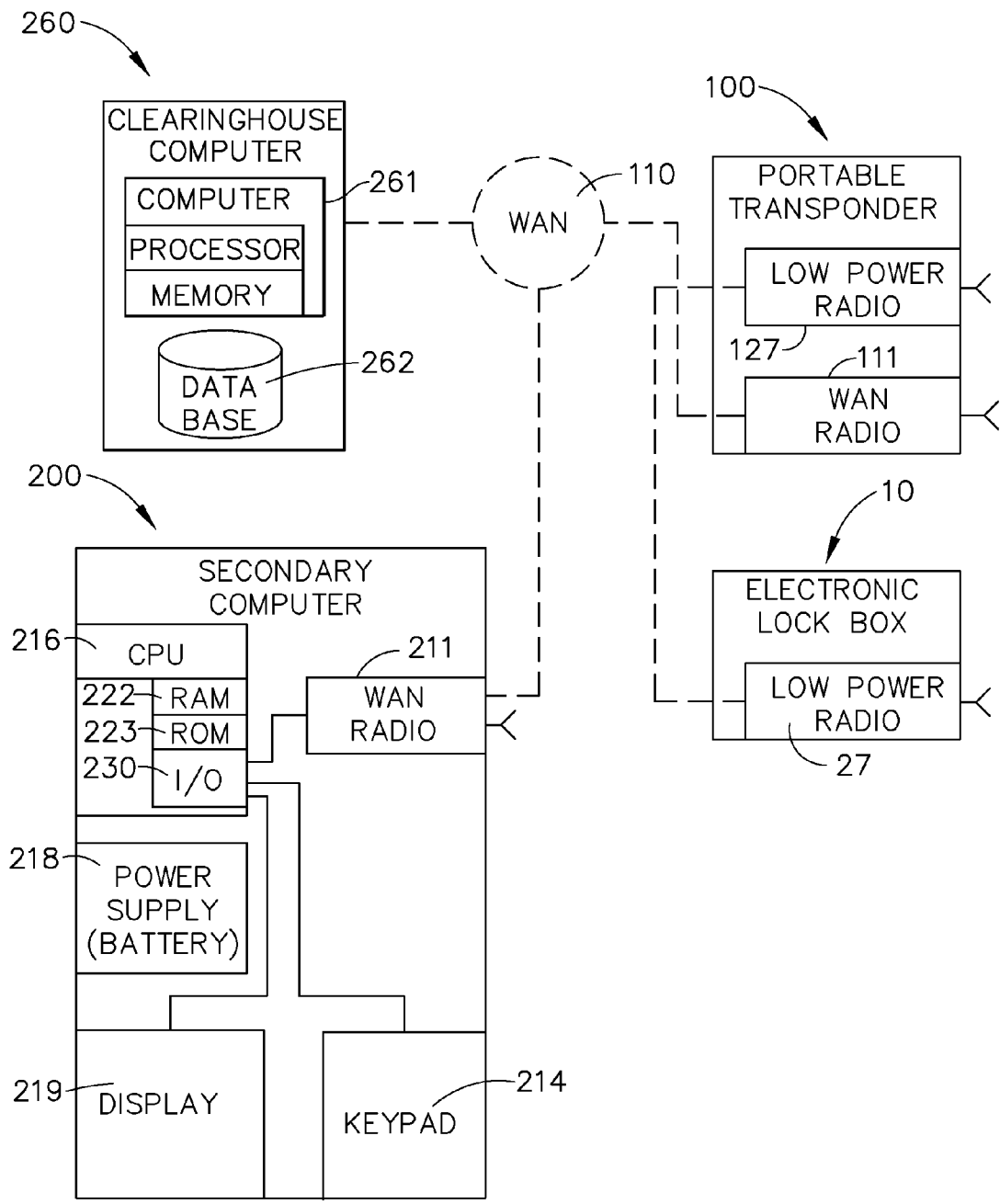
FIG. 3 is a diagrammatic view of the major components of a second embodiment of an electronic lockbox security system, including a central computer station, a wireless portable transponder device, a wireless portable secondary computer, and a portable electronic lockbox apparatus such as that depicted in FIG. 1.

FIG. 3 illustrates a second embodiment of an electronic lockbox system that includes the central clearinghouse computer 260, one or more portable transponders 100, and one or more electronic lockboxes 10. The system of FIG. 3 also includes a wide area network 110 that could use a standard cellular telephone service, if desired.

The clearinghouse computer 260 includes a computer 261 with a processor and memory, and also includes a database 262 to hold access event data as well as a myriad of other types of information used by the electronic lockbox system. The portable transponder 100 again includes a low power radio 127 and a wide area network radio 111. The electronic lockbox 10 again includes a low power radio 27, which communicates with the transponder's low power radio 127.

The second embodiment system of FIG. 3 includes an additional component, which is listed thereon as "secondary computer" 200. Secondary computer 200 includes a microprocessor (CPU) 216, and this computer (or processing circuit) also is coupled to random access memory 222, read only memory 223, and an input/output interface circuit 230. The secondary computer 200 also includes a display 219, a keypad 214, a power supply 218 (typically a battery), and a wide area network (WAN) radio 211. The WAN radio 211 can also be placed in communication with the wide area network 110, and therefore, can communicate with the clearinghouse computer 216 or the portable transponder 100 as desired.

As described above, the secondary computer 200 could be constructed as a standard commercial device, such as a wireless laptop computer, or an Internet-compatible cellular telephone (or "smart phone"), for example.

Figure 4:
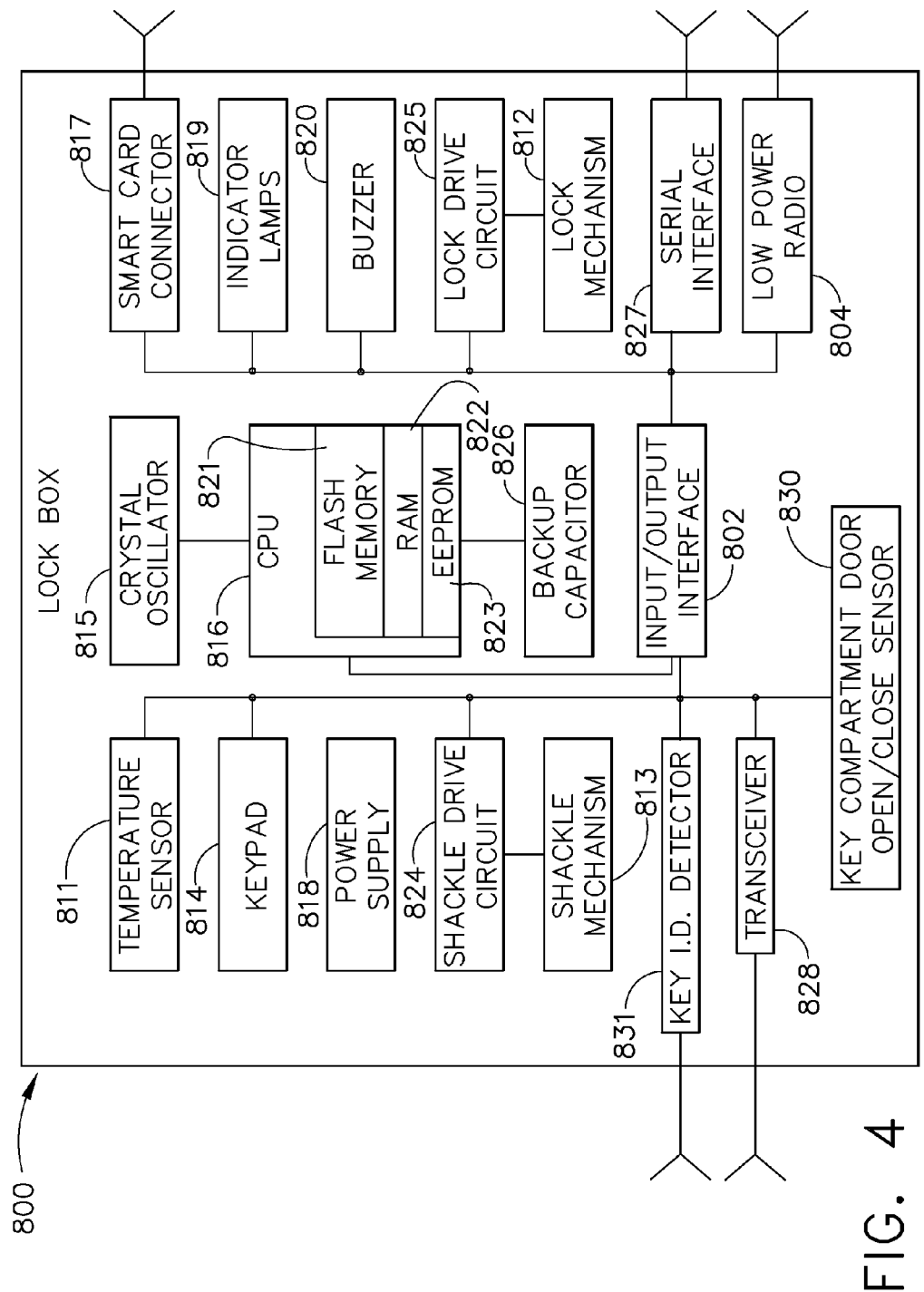
FIG. 4 is a block diagram showing some of the major hardware components of an electronic lockbox that communicates with a wireless portable electronic key, such as a "smart phone," and that also communicates with an identification device, such as an RFID transceiver circuit, as constructed according to the principles of the technology disclosed herein.

Lockbox with Wireless Communications to an Electronic Key:

An alternative lockbox design is provided in FIG. 4, which shows many of the major electronic components, generally designated by the reference numeral 800, in a block diagram. Most of the components listed in this block diagram are also found in the earlier versions of an electronic lockbox sold by SentriLock, LLC of Cincinnati, Ohio. A brief description of these components follows:

Electronic lockbox 800 includes a microprocessor (CPU) 816, FLASH memory 821, random access memory (RAM) 822, EEPROM (electrically erasable programmable read only memory) 823, a battery (or other electrical power supply) 818, a memory backup capacitor 826, an ISO-7816 smart card connector 817, indicator LED lamps 819, a piezo buzzer 820, a crystal oscillator 815, a digital temperature sensor 811 (these last two devices can be combined into a single chip) a shackle drive circuit 824, a shackle release mechanism 813, a key compartment mechanism drive circuit 825, a key compartment lock/release mechanism 812, and a membrane style keypad 814 for user data entry.

A serial interface 827 is also included so that the CPU 16 is able to communicate with other external devices, such as a separate portable computer in the form of a PDA (personal digital assistant) or other type of portable computing device that uses a serial data link. For example, serial interface 827 can comprise in infrared (IR) port that communicates with a standard IR port found on many PDAs; or it could use a different communications protocol, such as BlueTooth. A low power radio 804 is included for communications with a portable electronic key (not shown on FIG. 4). This radio 804 could have any number of types of communications protocols, including one that allows the lockbox 800 to exchange data with an electronic key in the form of a smart phone. A special software application program (an "APP") would run on the smart phone, to allow it to communicate with lockbox 800.

Microprocessor 816 controls the operation of the electronic lockbox 800 according to programmed instructions (electronic lockbox control software) stored in a memory device, such as in FLASH memory 821. RAM memory 822 is typically used to store various data elements such as counters, software variables and other informational data. EEPROM memory 823 is typically used to store more permanent electronic lockbox data such as serial number, configuration information, and other important data. It will be understood that many different types of microprocessors or microcontrollers could be used in the electronic lockbox 800, and that many different types of memory devices could be used to store data in both volatile and non-volatile form, without departing from the principles of this technology. In one mode of an exemplary embodiment, the electronic lockbox CPU 816 is an 8-bit Atmel Mega8 microcontroller that incorporates RAM 822, FLASH memory 821 and EEPROM memory 823 internally (as on-board memory).

Battery 818 provides the operating electrical power for the electronic lockbox. Capacitor 826 is used to provide temporary memory retention power during replacement of battery 818. It will be understood that an alternative electrical power supply could be used if desired, such as a solar panel with the memory backup capacitor.

An input/output (I/O) interface circuit 802 is provided so the microprocessor 816 can exchange data and operational signals with external devices, or with integral devices to the lockbox that require greater power than can be directly supplied by the microprocessor's pinouts. This puts the I/O circuit 802 in the pathway for virtually all signals that are used in the controlling of lockbox 800, including the data signals that are involved with the serial interface 827, the smart card connector 817, and the low power radio 804.

Electronic lockbox 800 generally includes a shackle (see item 946 on FIG. 5) that is typically used to attach the lockbox 800 to a door handle or other fixed object. However, it should be noted that stationary versions of these electronic lockboxes are now available that are permanently affixed to buildings, or other large object, and such stationary versions do not require shackles. One such stationary lockbox is illustrated in FIG. 6—see description below.

Figure 5:
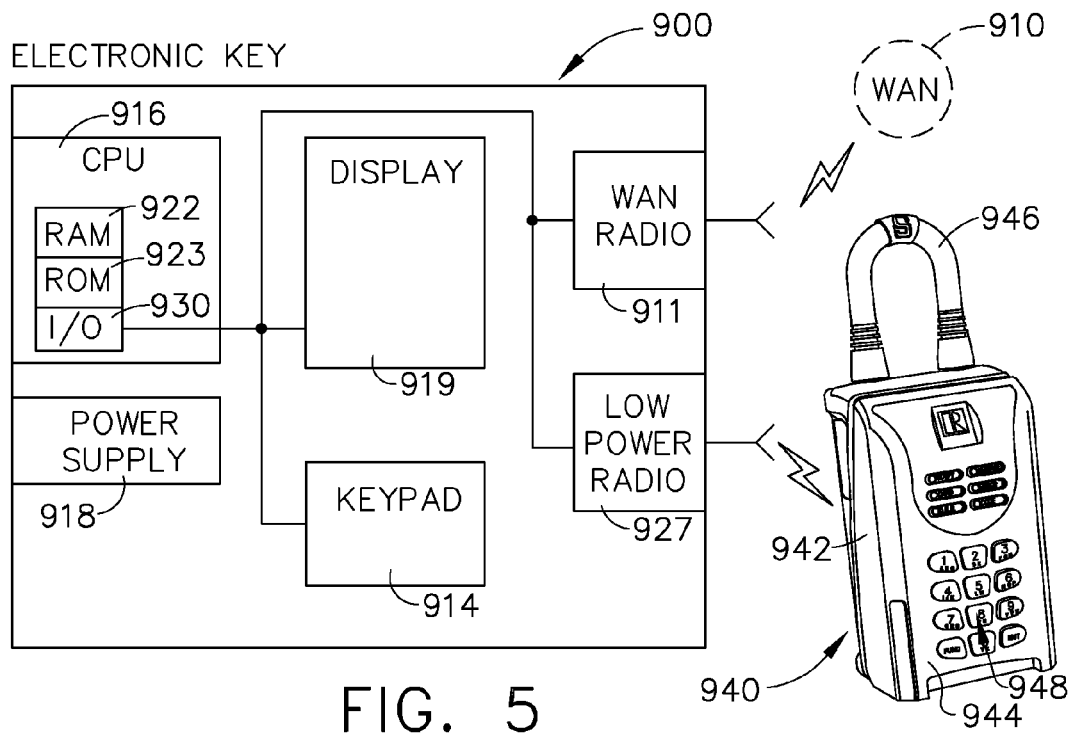
FIG. 5 is a block diagram showing some of the major hardware components of a portable electronic key that is capable of wireless communication with one of the electronic lockboxes of FIG. 1 or FIG. 4, for example, and that is capable of wireless communication with a wide area network, such as a cellular telephone system.
Figure 6:
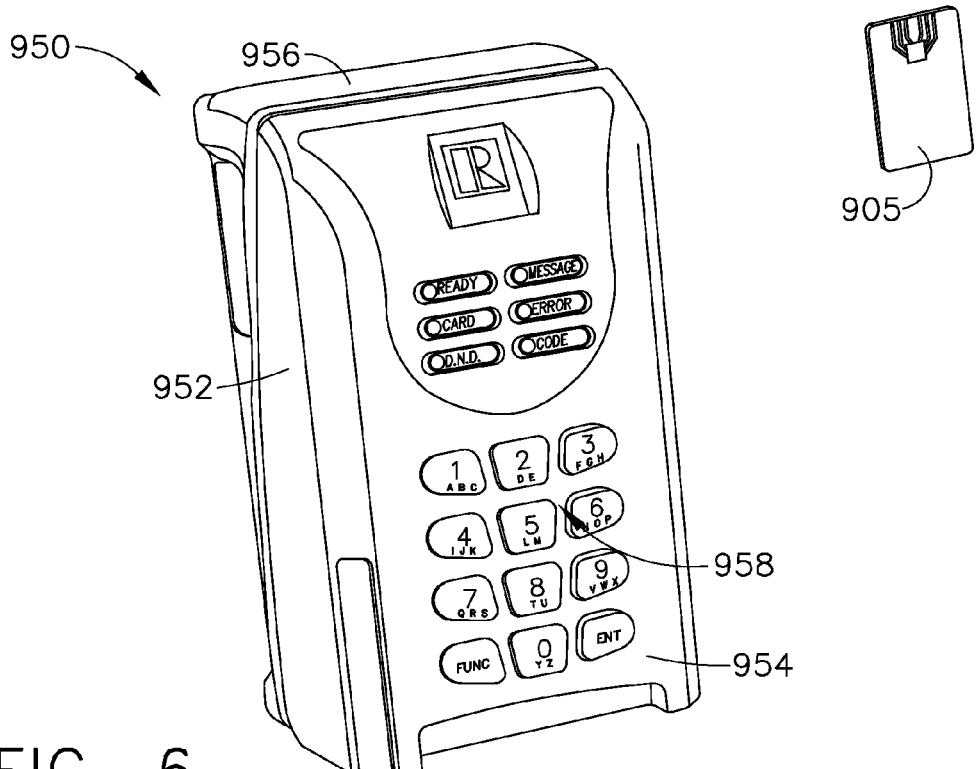
FIG. 6 is a perspective view of a stationary electronic lockbox, which includes the hardware components that are depicted in FIG. 1 or FIG. 4, for example.

Electronic lockbox 800 also includes a key compartment which typically holds a dwelling key (not shown), and which can be accessed via a key access door 32 (see FIG. 2), or a key access door 944 (see FIG. 5). Note that the structure called a "key access door" is also sometimes referred to herein as a "controlled access member." The key compartment's lock and release mechanism 812 uses a motor mechanism (not shown) that is controlled by drive circuit 825 that in turn is controlled by CPU 816. Shackle release mechanism 813 also uses a motor, which is controlled by drive circuit 824 that in turn is controlled by CPU 816. It will be understood that the release or locking mechanisms used for the shackle and key compartment can be constructed of many different types of mechanical or electromechanical devices without departing from the principles of the technology disclosed herein.

The crystal oscillator 815 provides a steady or near-constant frequency (e.g., at 32.768 kHz) clock signal to CPU 816's asynchronous timer logic circuit. The ISO-7816 smart card connector 817 connects to smart card contacts to allow the exchange of data between the electronic lockbox's CPU 816 and the memory devices in the smart card.

In one embodiment, the digital temperature sensor 811 is read at regular intervals by the electronic lockbox CPU 816 to determine the ambient temperature. Crystal oscillator 815 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal oscillator 815 and thus compensating for the drift and allowing precise timing measurement regardless of electronic lockbox operating environment temperature. As noted above, a single chip can be used to replace the combination of crystal oscillator 815 and temperature sensor 811, such as a part number DS32KHZ manufactured by Dallas Semiconductor.

LED indicator lamps 819 and a piezo buzzer 820 are included to provide both an audible and a visual feedback of operational status of the electronic lockbox 800. Their specific uses are described in detail in other patent documents by the same inventor. Backup capacitor 826 is charged by battery 818 (or perhaps by another power source) during normal operation.

Electronic Key:

Referring now to FIG. 5, a block diagram is provided for showing many of the major electronic components of an electronic key, generally designated by the reference numeral 900. Part of FIG. 5 also diagrammatically shows certain other system components, such as a wide area network 910 and an electronic lockbox 940. This particular lockbox includes a housing 942, a movable door 944 that covers a secure compartment beneath its surface, a shackle 946, and a keypad 948 for entering data via a human user.

The electronic key 900 includes a microprocessor 916, which typically has on-board memory and interface components. On FIG. 5, the on-board memory circuit includes some RAM at 922, and ROM (or EEPROM) at 923. An input/output (I/O) interface circuit is depicted at 930. These on-board hardware components can be similar to those of the electronic lockbox, if desired. However, they are more likely to be part of a smart phone, which typically has very highly capable processing power and relatively large memory capacity.

Other hardware components of electronic key 900 include a power supply 918 (typically a battery), a display 919, a keypad 914 (which typically is part of a touch screen display, particularly if the electronic key is a smart phone and the display viewing area is large), a wide area network (WAN) radio circuit 911, and a low power radio circuit 927. The two radio circuits each have their own built-in antennas, as required for their broadcast and receive frequencies. The WAN radio 911 is designed to communicate with a wide area network, generally designated by the reference numeral 910; if electronic key 900 is a smart phone, for example, then the wide area network would generally be a cellular telephone network.

The low power radio circuit 927 is designed to communicate with one of the lockboxes of the overall security system. More specifically, the lower power radio 927 will exchange data messages with the low power radio circuit 804 of an electronic lockbox 800, as depicted on FIG. 4, or perhaps with the low power radio circuit 27 of an electronic lockbox 10, as depicted on FIG. 1. In the present technology disclosed herein, these low power radio circuits 927, 804, and perhaps 27, would comprise WiFi technology, particularly if the electronic key 900 is a smart phone. Of course, other communication protocols could be utilized without departing from the principles of the technology disclosed herein. As noted above, a special APP would run on the smart phone (as the electronic key 900), to allow it to communicate with a lockbox 800. The electronic key can be in the form of a smart phone, as noted above, and it also is sometime referred herein to as a "portable communications device."

It should be noted that the electronic lockbox 940 can also be accessed by use of a standard SentriLock smart card, such as the secure memory card depicted at 905 on FIG. 5. However, many of the features of the technology disclosed herein use the "instant" communications capabilities of an electronic key, including those in the form of a smart phone, for communicating both with a lockbox and with the central computer, in real time, or near-real time. Again, such devices can also be referred to as "portable communications devices."

Another form of electronic lockbox is illustrated in FIG. 6. A stationary electronic lockbox is generally depicted at the reference numeral 950. Lockbox 950 has no shackle, and instead is designed to be permanently mounted to a building or other durable fixed structure, for lockbox security systems that can involve dwellings or other types of buildings used for human habitat, or for housing other items in which a protective secure access is desired. In this disclosure, lockboxes 940 and 950 will be said to contain a "dwelling key" in their secure compartments, whether the protected structure or physical area actually contains human occupants or not.

Lockbox 950 has similar structural elements as compared to lockbox 940. There is a housing 952, a movable door 954 that covers a secure compartment beneath its surface, and a keypad 958 for entering data via a human user. Lockbox 950 will include the same electronic components and control software as lockbox 940, sans the shackle latch members and the shackle itself. Lockbox 950 is designed to securely communicate with an electronic key 900 or with a smart card 905, just like lockbox 940.

Figure 7:
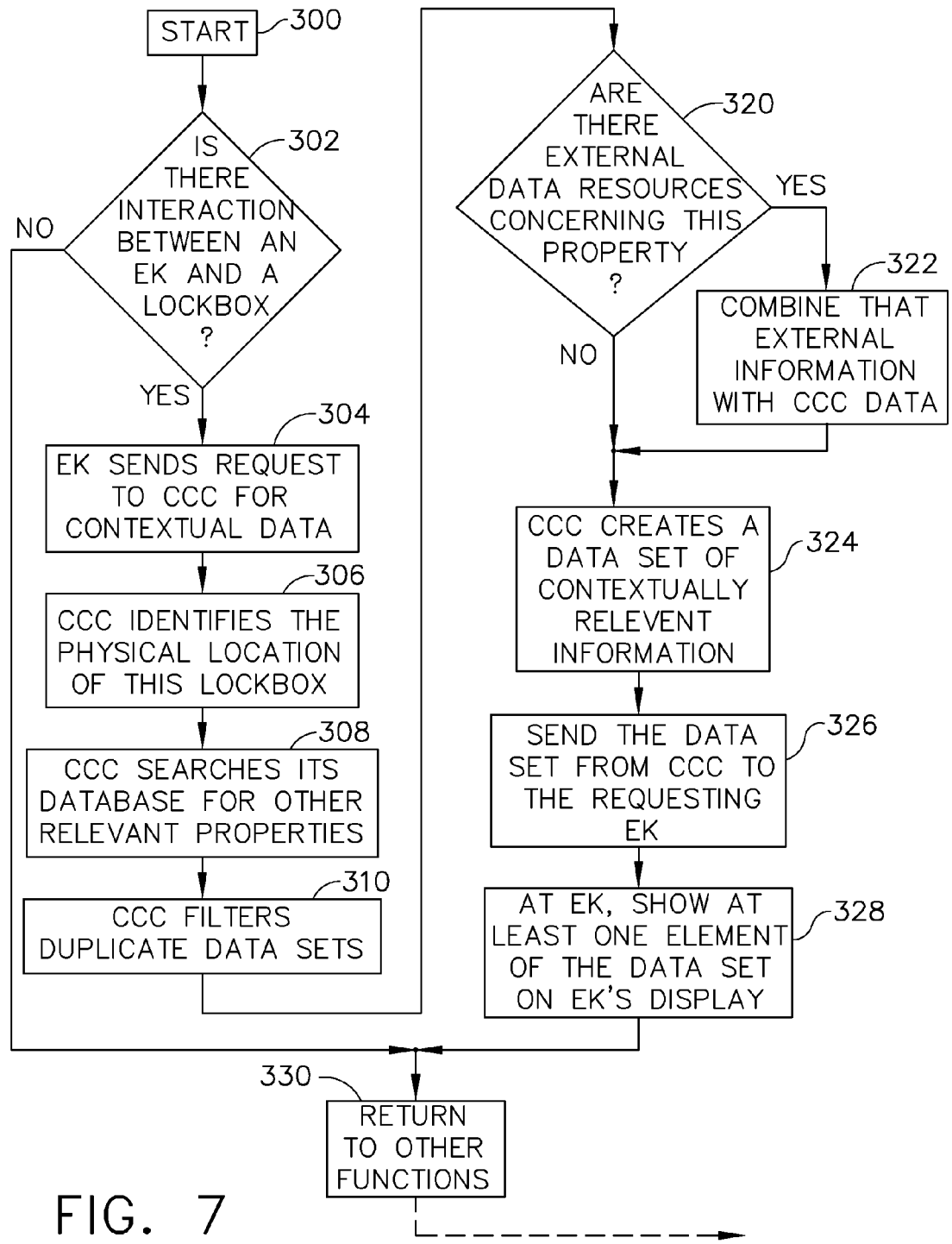
FIG. 7 is a flow chart of some of the steps executed by an electronic lockbox system to perform a "Real Time Data Delivery" routine, as part of the control logic for the technology herein.

Control Logic for Real Time Data Delivery Function:

Referring now to FIG. 7, a flow chart is provided to show some of the important steps performed mostly at the central clearinghouse computer (CCC) for a software routine that performs real time data delivery. Starting at a step 300, a decision step 302 determines whether there has been any interaction between an electronic key and a lockbox that has been reported to the central computer. This would become known at the central computer (the CCC) by some type of message received at the central computer, typically from the electronic key, including a "standard" electronic key such as a smart phone, or a simplified electronic key such as a secure memory card that has been used for years in lockbox systems provided by Sentrilock LLC of Cincinnati, Ohio. If the answer is NO after analyzing one of these messages, then the control logic returns to performing other functions at a step 330. However, if the answer is YES, and if the electronic key has sent a request, then the control logic arrives at a step 304.

At step 304, the electronic key's a request to the central computer is asking for contextual data for the property that is being visited (or that was most recently visited by the sales agent for that electronic key). A step 306 identifies the physical location of this lock box, which is determined at the central computer. A step 308 now has the central computer searching its database for other relevant properties, and then a step 310 has the central computer filtering duplicate data sets. In other words, another sales agent may have previously visited the same lockbox at that property's physical location, and could have asked for the same contextual data. In that situation, a data set of contextual for this same property might already be resident in the database at the central computer, and therefore, the central computer will not need to create a new data set.

Although the central computer can filter duplicate data sets at step 310, there still could be other relevant information that can be requested by the sales agent for the same physical property at the lockbox of interest. Therefore, a decision step 320 now determines whether or not there are external data resources of interest concerning that property. If so, then a step 322 combines that external information with the central clearinghouse computer data that was already being prepared. Examples of other information that could be relevant include information from Multiple Listing Service data (also called "MLS" data), environmental information (e.g., from the EPA), property tax information (e.g., from the County Auditor's website), and school district information.

Whether or not external data resources are available, the logic flow now arrives at a step 324 in which the central computer creates a data set of contextually relevant information. The central computer now sends (or "disseminates") the data set to the requesting electronic key at a step 326. Once that data set is received at the electronic key, a step 328 shows at least one element of the data set on the key's display. The sales agent would typically be able to scroll through various elements of that data set on his or her electronic key.

In essence, the primary function of the flow chart on FIG. 7 is for the central computer to assimilate relevant data for other properties, typically those that are in the same geographic area, and to combine that information with other external data resources concerning the property of interest (or at least properties of interest that are in the same geographic area), and thereby creating the data set that will be downloaded to the electronic key that sent the initial request at step 304. The word "assimilate" in this instance includes gathering data from as many databases as are relevant; it also includes gathering data from only the single database (albeit it a large database) that might reside in the central computer at the time of the search request. Certainly if the first sales agent to reach this property asks for the contextual data, then the assimilation function will not find any duplicate data sets to be filtered at step 310. All of these variations in the control logic for a particular request fall within the meaning of the word "assimilate."

To be most useful, the data delivery for the contextual data request will occur in "real time" or at least in near-real time. Therefore, it will be most likely that the sales agent will be using a "true" electronic key, such as a smart phone, so that the sales agent can make an instantaneous request for the contextual data actually during a property showing, and preferably while in the presence of his or her sales prospect. One of the main points that makes this aspect useful is to disseminate the contextually relevant information while the sales agent is actually meeting with the sales prospect, and while they are both at the property of interest (i.e., where that lockbox is located). While this is not a requirement for performing the functions of FIG. 7, it certainly makes this aspect of the technology disclosed herein more useful.

Figure 8:
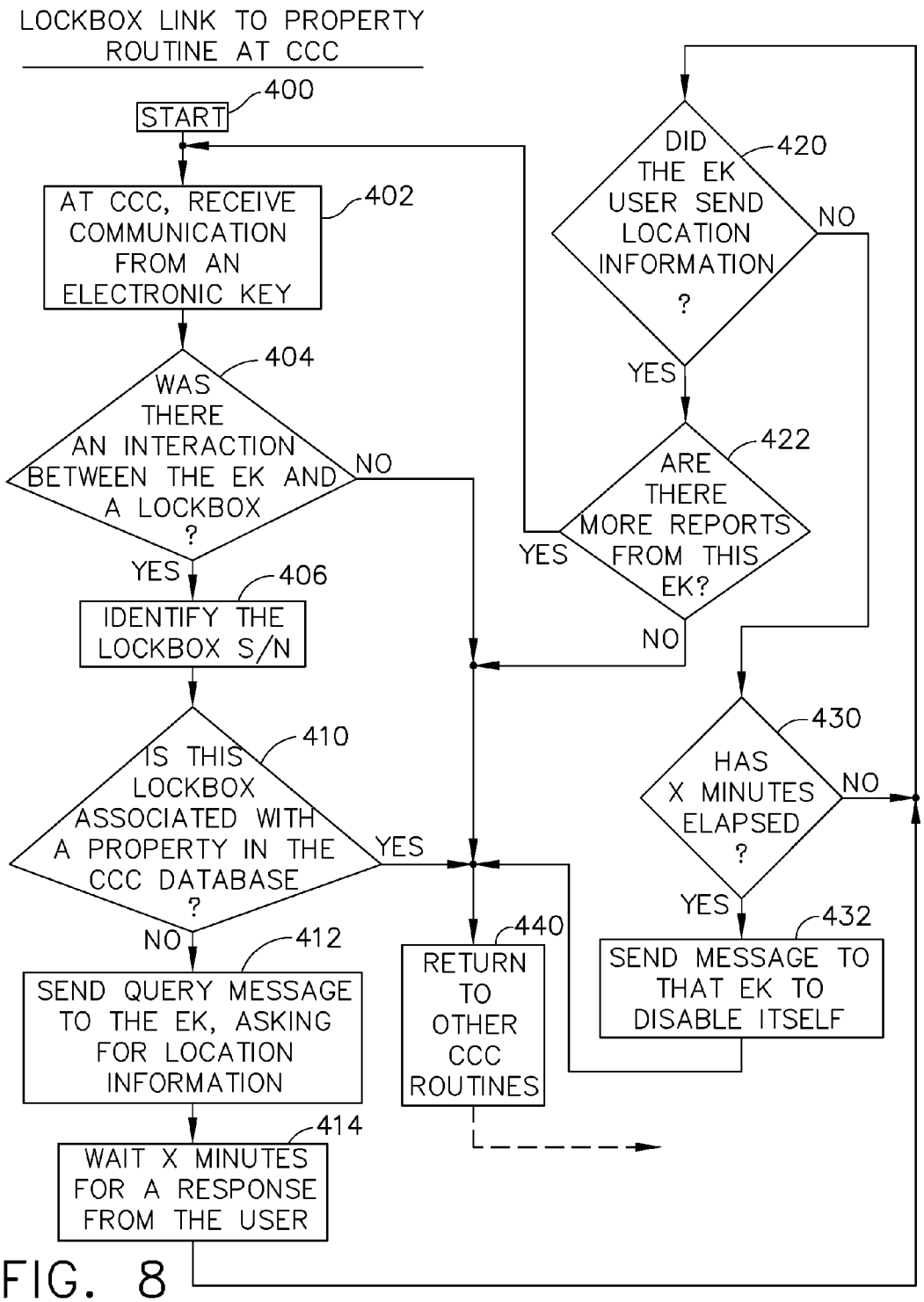
FIG. 8 is a flow chart of some of the steps executed by an electronic lockbox system to perform a "Lockbox Link to Property" routine, as part of the control logic for the technology herein.

Control Logic for Lockbox Link to a "New" Property Function:

Referring now to FIG. 8, some of the important steps of the control logic performed at the central clearinghouse computer for "linking" a lockbox to a particular property are disclosed, starting at a step 400. At a step 402, the central computer receives a communication from an electronic key. A decision step 404 now determines whether or not there was an interaction between the electronic key and a lockbox in the real estate system. If not, then the control logic returns to other central clearinghouse computer routines at a step 440. However, if the answer was YES, then the central computer will identify which lockbox was involved, by receiving the lockbox serial number from the electronic key, at a step 406.

In step 404, the question about whether or not there was an interaction between the electronic key and a lockbox will typically be in the form of an access event report that is received at the central computer from an electronic key. However, it does not necessarily have to be an access event report to be noteworthy, so far as the central computer is concerned. Any kind of interaction between the electronic key and a particular lockbox will be of interest to the central computer, and the central computer will still want to try to identify the lockbox by its serial number and to see if that lockbox is associated with a property that is already in the database at the central computer.

A decision step 410 now determines whether or not this lockbox is associated with a property that already is in the database of the central computer. If the answer is YES, then the control logic returns to performing other central computer routines at step 440. If not, then the central computer will now send a query message to electronic key, asking for location information, at a step 412. In this routine, the clearinghouse computer will now wait for "X" minutes for a response from the user of that electronic key, at a step 414. (It will be understood that with modern computer technology available today, the central computer will not literally wait for X minutes while performing no other routines; instead, the multitasking software of the central computer will perform many other routines, while also hoping to receive a response from the user in this particular function of FIG. 8.)

As part of the "waiting" portion of this routine, when a new message is received by the central computer, a step 420 determines whether or not the user of this electronic key has sent the location information that was requested. If not, then a decision step 430 determines whether or not X minutes have elapsed. If not, then this portion of the central computer's control software will go back to "waiting" and the logic flow is directed back to the step 420, where the central computer determines whether or not any message has been received from that user which includes the requested location information.

If the answer was YES at step 420, meaning that the user of the electronic key did send the location information, then a decision step 422 determines whether or not there are more reports from that particular electronic key. An example of that would be an access event report, and there could be more than one such report if the electronic key had been used to visit properties that were out of range of a cellular telephone receiving cell, which means that the electronic key would not have been able to send a report in at an earlier time. If the answer is YES at step 422, then the logic flow is directed back to the starting function at step 402. If there are not more reports from this electronic key, then the logic flow is directed to the return step at 440.

This "lockbox link to property routine" can have some teeth, if the real estate Board desires to implement the next optional feature. At decision step 430, if X minutes has elapsed and the user of the electronic key never sent the requested location information, then the logic flow is directed to a step 432 that will disable the electronic key for that user. This is accomplished by the central computer sending a message to that electronic key telling the key to disable itself. This might seem to be a drastic step, but it would only be executed if the user totally ignores the request from the central computer for a long time period. For example, the value for "X" could be 120 minutes, which would give the user two (2) hours to complete a showing with a sales prospect, and then to send a message to the central computer to identify the location of the property that is associated with that lockbox. If two hours is an insufficient time in the view of the real estate Board, then the value for X can be increased to whatever value seems to be reasonable.

Figure 9:
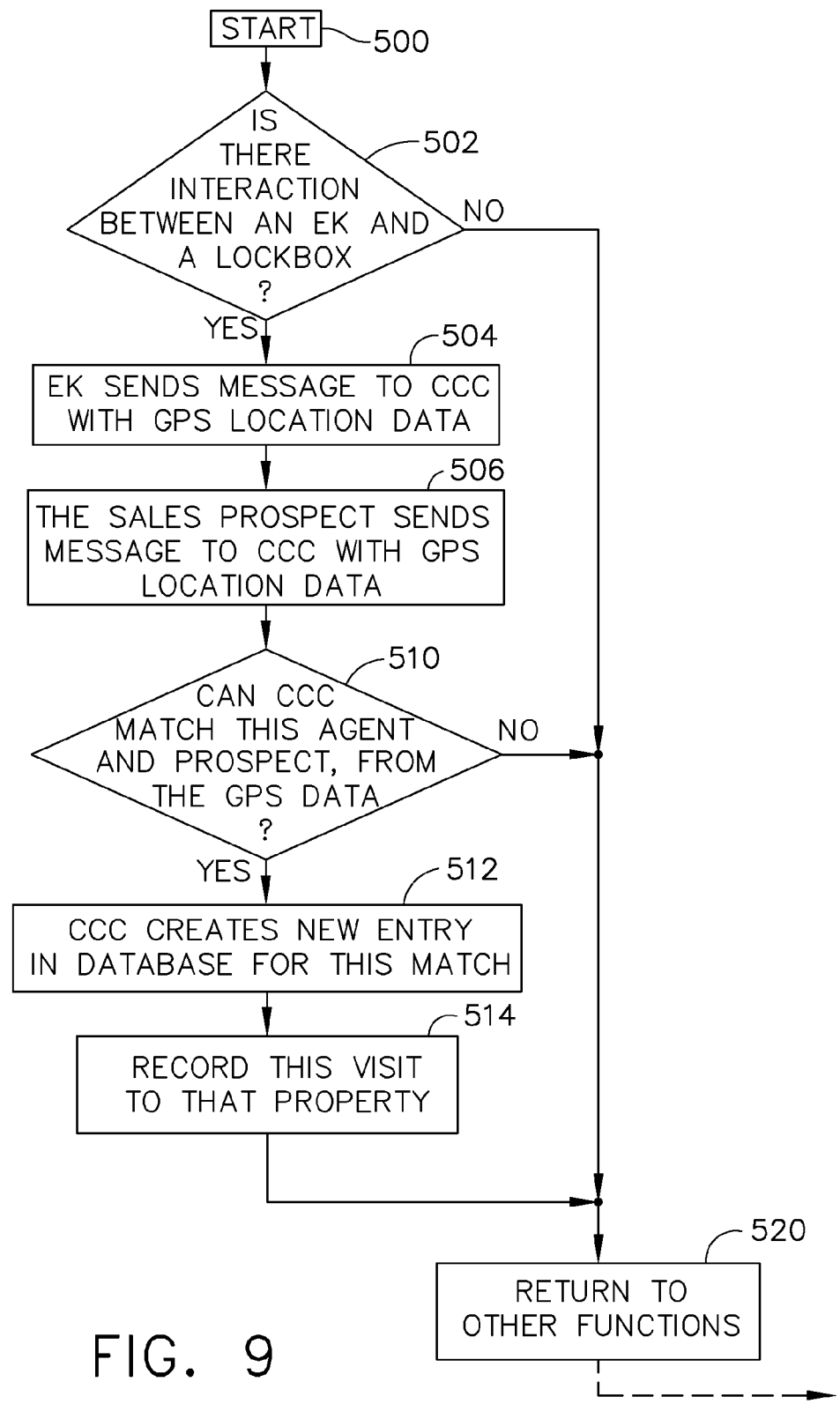
FIG. 9 is a flow chart of some of the steps executed by an electronic lockbox system to perform a "GPS Matching" routine, as part of the control logic for the technology herein.

Control Logic for Sales Agent Matching to Sales Prospect Function, Using GPS Data:

Referring now to FIG. 9, some of the important steps for a routine that matches a sales agent to a sales prospect is provided, starting at a step 500. A decision step 502 determines whether or not there has been an interaction between an electronic key and a lockbox, and if the answer is NO, then the control logic is directed to a step 520 that returns to other functions in the lockbox system. However, if there has been such interaction between an electronic key and a lockbox, one form of that could be if the electronic key sends a message to the central computer that includes GPS location data, at a step 504. Another message could also be received at the central computer from a sales prospect. In that situation, the message at the central computer is received from the sales prospect, and it can include GPS location data, at a step 506.

When the types of messages are received at the central computer that are generated at steps 504 and 506, a decision step 510 will try to match this particular sales agent and prospect, using their GPS data. In other words, if the central computer has received two messages that both have the same, or substantially the same, GPS location data, and if one of those messages is from a sales agent (using an electronic key) and the other message is from a sales prospect (using a cell phone that has a GPS receiver), then these two persons can be "matched." In that situation, the central computer creates a new entry in the database for that match at a step 512. When that occurs, the central computer will also record this visit to the particular property that is in the central computer's database, at a step 514. After that occurs the logic flow is directed to the return step 520.

If the central computer cannot determine any match between this sales agent and a prospect at step 510, then the logic flow is immediately directed to the return step 520.

It will be understood that the decision step 510 may determine a match between the sales agent and the prospect, however, such a match might already exist in the central computer's database. In that situation, then a "new" entry for that match will not be required. However, it is still desirable to have the control logic run through both steps 512 and 514, in case this same sales agent and prospect visit a different property together. In that situation, it will be desirable to record the visit by that matched pair to that second property. If the central computer determines that the visit to the second property is not the first visit by that matched pair, then that information can be filtered, if desired. However, as will be discussed below in reference to FIG. 10, there are reasons that it is desirable to record all visits to the properties in the real estate Board region, including second visits or even third visits to the same property.

It will be understood that the central computer is already recording visits to particular properties within a real estate Board, and such visits have been recorded by various electronic lockbox systems for years. That information is not necessarily based on any type of GPS location data, but the lockbox access events are recorded at the central computer, and that type of information can be accessed later by the sales agent. The routine of FIG. 9 now allows a sales prospect to also be included in the history of property visits in this central computer system, and it will occur automatically when it is based on GPS location data that is provided in messages from the sales prospect (in step 506), or by GPS location data for a sales agent (in step 504). All of this relevant information, including access events that are not based on GPS data by a sales agent, can be later displayed in a property visit history routine that is discussed immediately below, in reference to FIG. 10.

Figure 10:
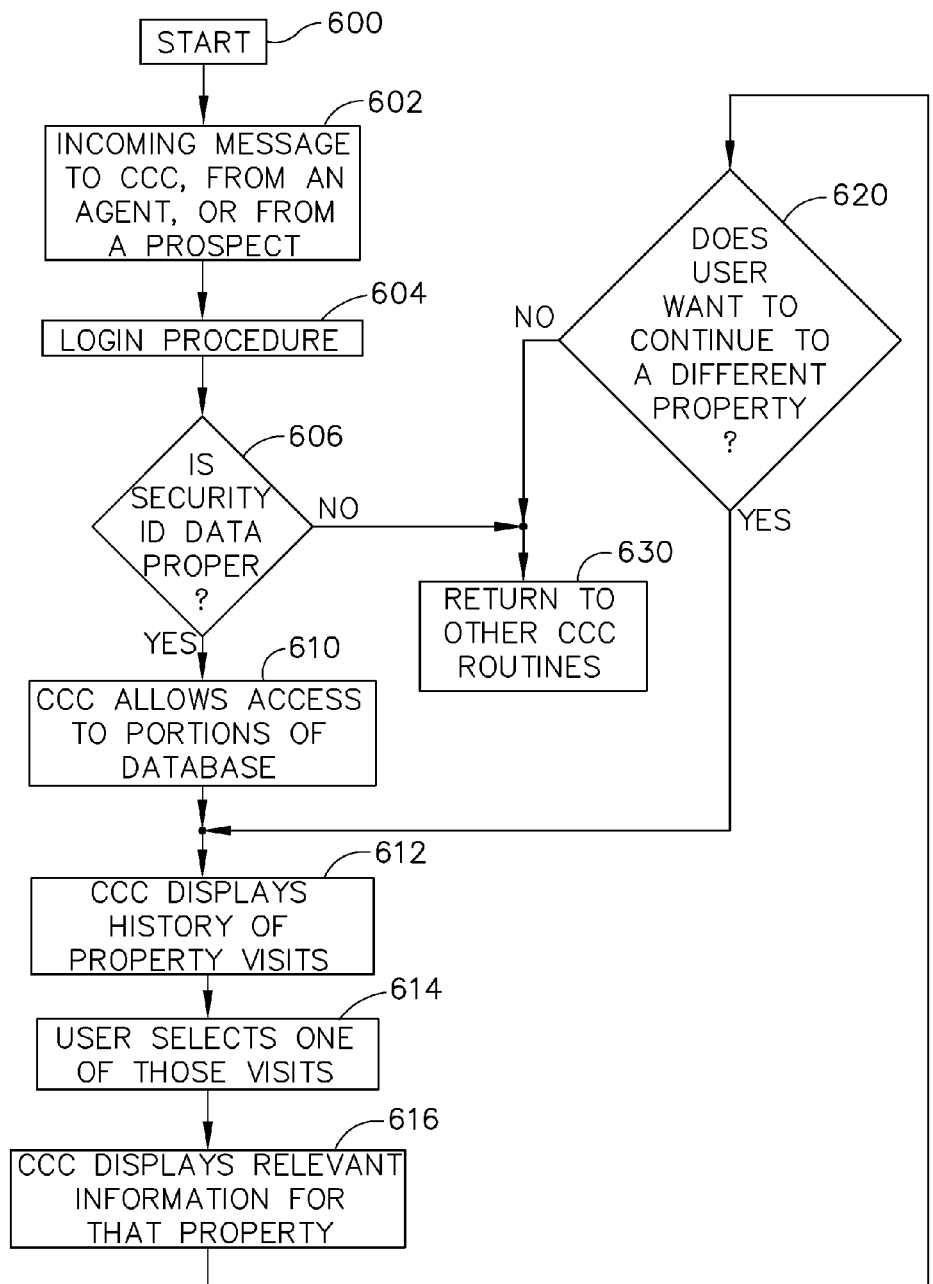
FIG. 10 is a flow chart of some of the steps executed by an electronic lockbox system to perform a "Property Visit History" routine, as part of the control logic for the technology herein.

Control Logic for Sales Agent or Prospect Property Visits History Function:

Referring now to FIG. 10, a flow chart is provided to show some of the important steps in a routine that provides a history of property visits by authorized persons in the central computer system for a real estate Board. It should be noted that, although the routines disclosed herein are described in reference to use with a real estate Board, it will be understood that other types of information systems can use the technology disclosed herein besides standard "real estate boards." Other types of personnel can also use the inventive functions disclosed herein, including authorized persons who might visit certain property locations, such as medical personnel, or fire department or police department personnel, who could access a property by use of a lockbox. Such lockboxes can be permanently attached to a building, such as the lockbox disclosed in FIG. 6 that does not have a shackle.

In FIG. 10, the starting step 600 will be followed by a step 602 in which the central computer of a real estate Board receives a message from an agent or from a sales prospect. When that occurs, the particular agent or prospect must undergo a login procedure, at a step 604. A decision step 606 determines whether or not the security identification data that is provided by the messenger to the central computer is proper. If not, then this routine quickly stops and the logic flow is directed to a return step 630.

It will be understood that there are existing lockbox systems with central computers that have previously established login procedures by authorized sales agents, and that type of procedure can be used in the flow chart of FIG. 10, at steps 602, 604, and 606. However, in FIG. 10 it is also desirable to allow a sales prospect to login to the central computer to perform the remaining steps of FIG. 10. This will require a different type of routine that will allow a non sales agent to be allowed to register a username and password, typically over the Internet, for that central computer. This type of information can be handled by well-known security routines, and may include asking the sales prospect for other identifying information, including "hints" for situations where the user might later forget his or her password, or user name. All of those concepts are possibilities for the control logic on FIG. 10.

Assuming the security identification was proper at step 606, the central computer will allow access to certain portions of its database at a step 610. For this routine of FIG. 10, the "history" of property visits is what is of interest, and that history is displayed by the central computer at a step 612. In this situation, the central computer will be sending information to the sales agent or to the sales prospect, typically over the Internet, and that information will be displayed on either an electronic key or some type of computer that is tied into the Internet. Once the receiving party has that data, then that receiving party (i.e., the user) selects one of those visits that is being displayed, at a step 614. The central computer will now display relevant information for that property, at a step 616. This type of information can be anything that the central computer determines should be allowed for display for that particular user, whether it is a sales agent or a sales prospect. Of course, a sales agent may be allowed to have access to certain types of data that a sales prospect would never be allowed to see, at least not through this routine at this central computer. It will be understood that the interaction between the user and the central computer in steps 610-616 will typically include much back and forth, so that the user can request many different types of information, and then have such information displayed by the central computer, one record at a time.

Once the user is finished looking at the relevant information for that particular property, then the central computer will ask the user whether or not he or she wants to continue to a different property in the history log of property visits, at a decision step 620. If the answer is YES, the logic flow is directed back to step 612, where the central computer again displays a history of property visits for that particular user. The user than can continue by selecting one of those visits at step 614, and so forth. If the user does not want to continue to a different property at step 620, then the logic flow is directed to step 630, where the processing returns to other central clearinghouse computer routines.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

Some additional information about "basic" lockbox embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued on Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. patent application Ser. No. 11/954,695, filed on Dec. 12, 2007 (Publication No. US 2008/0246587), for ELECTRONIC LOCK BOX WITH TRANSPONDER BASED COMMUNICATIONS; U.S. Pat. No. 8,164,419, issued on Apr. 24, 2012, for ELECTRONIC LOCK BOX WITH TIME-RELATED DATA ENCRYPTION BASED ON USER-SELECTED PIN; U.S. Pat. No. 8,151,608, issued on Apr. 10, 2012, for ELECTRONIC LOCK BOX WITH MECHANISM IMMOBILIZER FEATURES; U.S. patent application Ser. No. 12/756,741, filed on Apr. 8, 2010 (Publication No. US 2011/0251876), for ELECTRONIC LOCK BOX SYSTEM WITH INCENTIVIZED FEEDBACK; and U.S. patent application Ser. No. 12/883,628, filed on Sep. 16, 2010 (Publication No. US 2012/0068817), for ELECTRONIC LOCK BOX PROXIMITY ACCESS CONTROL. These patent documents are incorporated by reference herein, in their entirety.

It will be understood that the logical operations described in relation to the flow charts of FIGS. 7-10 can be implemented using sequential logic (such as by using microprocessor technology), or using a logic state machine, or perhaps by discrete logic; it even could be implemented using parallel processors. One preferred embodiment may use a microprocessor or microcontroller (e.g., the processor 16) to execute software instructions that are stored in memory cells within an ASIC. In fact, an entire microprocessor (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented.

It will also be understood that the precise logical operations depicted in the flow charts of FIGS. 7-10, and discussed above, could be somewhat modified to perform similar, although not exact, functions without departing from the principles of the technology disclosed herein. The exact nature of some of the decision steps and other commands in these flow charts are directed toward specific future models of lockbox systems (those involving lockboxes sold by SentriLock, LLC, for example) and certainly similar, but somewhat different, steps would be taken for use with other models or brands of lockbox systems in many instances, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multipart component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A method for operating an electronic lockbox system, said method comprising:
    (a) providing a first electronic lockbox having a first processing circuit, a first memory circuit, a first short range wireless communications circuit, and a secure compartment having a movable opening element that is under the control of said first processing circuit;
    (b) providing at least one portable communications device, including a first portable communications device of said at least one portable communications device, said first portable communications device having a second processing circuit, a second memory circuit, a display, a data entry device, a second short range wireless communications circuit, and a first WAN communications circuit for communicating with a wide area network;
    (c) providing a central computer having a third processing circuit, a third memory circuit containing at least one database, and a second WAN communications circuit for communicating with said wide area network, said at least one database of said central computer having a capability for storing information for a plurality of electronic lockboxes assigned to said electronic lockbox system, including said first electronic lockbox;
    (d) in response to a communication event occurring between said first electronic lockbox and said first portable communications device, sending, by use of said first WAN communications circuit, an indication of such communication event to said central computer;

(e) at said central computer, assimilating a first data set of contextually relevant information relating to a property to which said first electronic lockbox is assigned;

(f) after assimilating said at least one data set of contextually relevant information pertaining to said first electronic lockbox:
  (i) searching through said at least one database to determine whether at least a second data set of contextually relevant information pertaining to said first electronic lockbox is already stored in said at least one database;
  (ii) if so, then comparing said second data set to said first data set, to determine if substantially identical information exists in both said first and second data sets;
  (iii) if so, then identifying, by the central computer, said first and second data sets as being duplicate data sets;
  (iv) then filtering, by the central computer, said duplicate data sets, by combining said first data set and second data set into a remaining data set of contextually relevant information pertaining to said first electronic lockbox;

(g) generating a history report about property visits by a first user of said first portable communications device, said history report including:
  (i) said remaining data set of contextually relevant information pertaining to said first electronic lockbox; and
  (ii) a history log of property visits; and (g) sending, by use of said second WAN communications circuit, said history report to said first portable communications device.

2. The method of claim 1, further comprising the steps of:
(a) providing a second portable communications device of said at least one portable communications device, said second portable communications device having a fourth processing circuit, a fourth memory circuit, a second display, a second data entry device, and a third WAN communications circuit for communicating with said wide area network;
(b) generating a second history report about property visits by a second user of said second portable communications device, said second history report including:
  (i) said remaining data set of contextually relevant information pertaining to said first electronic lockbox; and
  (ii) a history log of property visits by said second user; and
(c) sending a message to said second portable communications device, wherein:
  (i) said second user comprises a sales prospect who cannot generate a communication event with said first electronic lockbox; and
  (ii) said first user comprises a sales agent of said electronic lockbox system who is able to generate a communication event with said first electronic lockbox.

3. The method of claim 1, further comprising the steps of:
(a) receiving said at least one data element at said at least one portable communications device; and
(b) displaying said at least one data element at said at least one portable communications device.

4. The method of claim 1, wherein said data set contains information relating to at least one of the following: (a) Multiple Listing Service data about properties; (b) environmental information; (c) property tax information; and (d) school district information.

5. An electronic lockbox system, said system comprising:
(a) a first electronic lockbox having a first processing circuit, a first memory circuit, a first short range wireless communications circuit, and a secure compartment having a movable opening element that is under the control of said first processing circuit;
(b) at least one portable communications device, including a first portable communications device of said at least one portable communications device, said first portable communications device having a second processing circuit, a second memory circuit, a display, a data entry device, a second short range wireless communications circuit, and a first WAN communications circuit for communicating with a wide area network; and
(c) a central computer having a third processing circuit, a third memory circuit containing at least one database, and a second WAN communications circuit for communicating with said wide area network, said at least one database of said central computer having a capability for storing information for a plurality of electronic lockboxes assigned to said electronic lockbox system, including said first electronic lockbox;
wherein said first, second, and third processing circuits are programmed with computer code to perform functions of:
(d) in response to a communication event occurring between said first electronic lockbox and said first portable communications device, to send, by use of said first WAN communications circuit, an indication of such communication event to said central computer;
(e) at said central computer, to assimilate a first data set of contextually relevant information relating to a property to which said first electronic lockbox is assigned;
(f) after assimilating said at least one data set of contextually relevant information pertaining to said first electronic lockbox:
  (i) to search through said at least one database to determine whether at least a second data set of contextually relevant information pertaining to said first electronic lockbox is already stored in said at least one database;
  (ii) if so, then to compare said second data set to said first data set, to determine if substantially identical information exists in both said first and second data sets;
  (iii) if so, then to identify, by the central computer, said first and second data sets as being duplicate data sets;
  (iv) then to filter, by the central computer, said duplicate data sets, by combining said first data set and second data set into a remaining data set of contextually relevant information pertaining to said first electronic lockbox;
(g) to generate a history report about property visits by a first user of said first portable communications device, said history report including:
  (i) said remaining data set of contextually relevant information pertaining to said first electronic lockbox; and
  (ii) a history log of property visits; and
(g) to send, by use of said second WAN communications circuit, said history report to said first portable communications device.

6. The system of claim 5, wherein said third processing circuit is further programmed with computer code to perform functions of:
(a) to provide a second portable communications device of said at least one portable communications device, said second portable communications device having a fourth processing circuit, a fourth memory circuit, a second display, a second data entry device, and a third WAN communications circuit for communicating with said wide area network;

(b) to generate a second history report about property visits by a second user of said second portable communications device, said second history report including:
(i) said remaining data set of contextually relevant information pertaining to said first electronic lockbox; and
(ii) a history log of property visits by said second user; and
(c) to send a message to said second portable communications device, wherein:
(i) said second user comprises a sales prospect who cannot generate a communication event with said first electronic lockbox; and
(ii) said first user comprises a sales agent of said electronic lockbox system who is able to generate a communication event with said first electronic lockbox.

7. The system of claim 5, wherein said second processing circuit is further configured:
(a) to receive said at least one data element at first portable communications device; and
(b) to display said at least one data element at said first portable communications device.

8. The system of claim 5, wherein said data set contains information relating to at least one of the following: (a) Multiple Listing Service data about properties; (b) environmental information; (c) property tax information; and (d) school district information.

9. The system of claim 5, wherein said first and second short range wireless communications circuits each comprise at least one of:
(a) a wireless electromagnetic radio transmitter;
(b) a wireless electromagnetic radio receiver;
(c) a wireless electromagnetic optical transmitter;
(d) a wireless electromagnetic optical receiver;
(e) a wireless magnetic field generator; and
(f) a wireless magnetic field sensor.

10. The system of claim 5, wherein said first and second WAN communications circuits each comprise at least one of:
(a) a cellular telephone;
(b) a smart phone that interfaces with a cellular telephone network;
(c) a wireless electromagnetic radio transmitter that interfaces with the Internet;
(d) a wireless electromagnetic radio receiver that interfaces with the Internet;
(e) a land line transmission circuit that interfaces with the Internet; and
(f) a land line receiver circuit that interfaces with the Internet.

11. A method for operating an electronic lockbox system, said method comprising:
(a) providing an electronic lockbox having a first processing circuit, a first memory circuit, a first short range wireless communications circuit, and a secure compartment having a movable opening element that is under the control of said first processing circuit;
(b) providing a plurality of portable communications devices, including a first portable communications device of said plurality of portable communications devices, said first portable communications device having a second processing circuit, a second memory circuit, a display, a data entry device, a GPS receiver, a second short range wireless communications circuit, and a first WAN communications circuit for communicating with a wide area network;
(c) providing a central computer having a third processing circuit, a third memory circuit containing at least one database, and a second WAN communications circuit for communicating with said wide area network;
(d) establishing a first database in said third memory circuit of the central computer, said first database used for containing relationship information between agents and prospects;
(e) sending, using said first WAN communications circuit, a message from said first portable communications device to said central computer, said message including GPS location data;
(f) updating said first database in said central computer, based on a proximal GPS location of said first portable communications device substantially at a time when said first portable communications device communicates with said electronic lockbox;
(g) providing a second portable communications device of said plurality of portable communications devices, said second portable communications device having a fourth processing circuit, a fourth memory circuit, a second display, a second data entry device, a second GPS receiver, a third short range wireless communications circuit, and a third WAN communications circuit for communicating with said wide area network;
(h) sending, using said third WAN communications circuit, a message from said second portable communications device to said central computer, a message including GPS location data;
(i) updating said first database in said central computer, based on a proximal GPS location of said second portable communications device substantially at a time when said second portable communications device communicates with said central computer;
(j) determining if said central computer can match a first user of said first portable communications device and a second user of said second portable communications device, from said GPS location data in real time; and
(k) if so, then creating a new entry in said first database of the central computer, for containing appropriate match information of said first and second users.

12. The method of claim 11, further comprising the steps of:
establishing a second database in said second memory circuit of the first portable communications device, said second database used for containing portable communications device relationships; and
updating said second database in said first portable communications device, based on a proximal GPS location of said first portable communications device substantially at a time when said first portable communications device communicates with said electronic lockbox.

13. The method of claim 11, further comprising the steps of:
(a) creating a data set at said central computer based upon said first database of portable communications device relationships; and
(b) disseminating said data set to at least one of said plurality of portable communications devices.

14. The method of claim 13, further comprising the steps of:
(a) providing a second portable communications device of said plurality of portable communications devices, said second portable communications device having a fourth processing circuit, a fourth memory circuit, a second display, a second data entry device, a third short range wireless communications circuit, and a third WAN communications circuit for communicating with said wide area network; and (b) accessing information stored in said third memory circuit of the central computer, using said second portable communications device, thereby receiving said data set at said second portable communications device.

15. An electronic lockbox system, said system comprising:
(a) an electronic lockbox having a first processing circuit, a first memory circuit, a first short range wireless communications circuit, and a secure compartment having a movable opening element that is under the control of said first processing circuit;
(b) a plurality of portable communications devices, including a first portable communications device of said plurality of portable communications devices, said first portable communications device having a second processing circuit, a second memory circuit, a display, a data entry device, a GPS receiver, a second short range wireless communications circuit, and a first WAN communications circuit for communicating with a wide area network; and
(c) a central computer having a third processing circuit, a third memory circuit containing at least one database, and a second WAN communications circuit for communicating with said wide area network;
wherein said first, second, and third processing circuits are programmed with computer code to perform functions of:
(d) to establish a first database in said third memory circuit of the central computer, said first database used for containing relationship information between agents and prospects;
(e) to send, using said first WAN communications circuit, a message from said first portable communications device to said central computer, said message including GPS location data; and
(f) to update said first database in said central computer, based on a proximal GPS location of said first portable communications device substantially at a time when said first portable communications device communicates with said electronic lockbox;
further comprising: a second portable communications device of said plurality of portable communications devices, said second portable communications device having a fourth processing circuit, a fourth memory circuit, a second display, a second data entry device, a second GPS receiver, a third short range wireless communications circuit, and a third WAN communications circuit for communicating with said wide area network; and
wherein said third and fourth processing circuit are programmed with computer code to perform functions of:
(g) to send, using said third WAN communications circuit, a message from said second portable communications device to said central computer, a message including GPS location data;
(h) to update said first database in said central computer, based on a proximal GPS location of said second portable communications device substantially at a time when said second portable communications device communicates with said central computer;
(i) to determine if said central computer can match a first user of said first portable communications device and a second user of said second portable communications device, from said GPS location data in real time; and
(j) if so, then to create a new entry in said first database of the central computer, for containing appropriate match information of said first and second users.

16. The system of claim 15, wherein said first and second processing circuits are further configured:
(a) to establish a second database in said second memory circuit of the first portable communications device, said second database used for containing portable communications device relationships; and
(b) to update said second database in said first portable communications device, based on a proximal GPS location of said first portable communications device substantially at a time when said first portable communications device communicates with said electronic lockbox.

17. The system of claim 15, wherein said third processing circuit is further configured:
(a) to create a data set at said central computer based upon said first database of portable communications device relationships; and
(b) to disseminate said data set to at least one of said plurality of portable communications devices.

18. The system of claim 17, further comprising: a second portable communications device of said plurality of portable communications devices, said second portable communications device having a fourth processing circuit, a fourth memory circuit, a second display, a second data entry device, a third short range wireless communications circuit, and a third WAN communications circuit;
wherein said fourth processing circuit is configured to access information stored in said third memory circuit of the central computer, using said second portable communications device, and thereby receive said data set at said second portable communications device.

19. A method for operating an electronic lockbox system, said method comprising:
(a) providing an electronic lockbox having a first processing circuit, a first memory circuit, a first short range wireless communications circuit, and a secure compartment having a movable opening element that is under the control of said first processing circuit;
(b) providing at least one portable communications device, including a first portable communications device of said at least one portable communications device, said first portable communications device having a second processing circuit, a second memory circuit, a display, a data entry device, a second short range wireless communications circuit, and a first WAN communications circuit for communicating with a wide area network;
(c) providing a central computer having a third processing circuit, a third memory circuit containing at least one database, and a second WAN communications circuit for communicating with said wide area network, and a network server;
(d) interacting with said electronic lockbox by said first portable communications device, by using said first and second short range wireless communications circuits;
(e) sending a message from said first portable communications device to said central computer, using said first and second WAN communications circuits, informing said central computer of the interaction between said electronic lockbox and said first portable communications device;
(f) at said central computer, identifying said electronic lockbox that was interacted with by a user of the first portable communications device; and
(g) at said central computer, determining if the identified lockbox is associated with a property in said at least one database of the central computer, and if not so associated, then:

(h) querying said user of said first portable communications device for at least one of: an address, and a location, of said electronic lockbox.

20. The method of claim 19, further comprising the steps of:
   (a) waiting for a predetermined time interval, and if said user does not respond to said query, then:
   (b) effectively preventing interaction between said first portable communications device and said electronic lockbox.

21. An electronic lockbox system, said system comprising:
   (a) an electronic lockbox having a first processing circuit, a first memory circuit, a first short range wireless communications circuit, and a secure compartment having a movable opening element that is under the control of said first processing circuit;
   (b) at least one portable communications device, including a first portable communications device of said at least one portable communications device, said first portable communications device having a second processing circuit, a second memory circuit, a display, a data entry device, a second short range wireless communications circuit, and a first WAN communications circuit for communicating with a wide area network; and
   (c) a central computer having a third processing circuit, a third memory circuit containing at least one database, and a second WAN communications circuit for communicating with said wide area network, and a network server;
   wherein said first, second, and third processing circuits are configured:
   (d) to interact with said electronic lockbox by said first portable communications device, by using said first and second short range wireless communications circuits;
   (e) to send a message from said first portable communications device to said central computer, using said first and second WAN communications circuits, informing said central computer of the interaction between said electronic lockbox and said first portable communications device;
   (f) at said central computer, to identify said electronic lockbox that was interacted with by a user of the first portable communications device; and
   (g) at said central computer, to determine if the identified lockbox is associated with a property in said at least one database of the central computer, and if not so associated, then:
   (h) to query said user of said first portable communications device for at least one of: an address, and a location, of said electronic lockbox.

22. The system of claim 21, wherein said second and third processing circuits are further configured:
   (a) to wait for a predetermined time interval, and if said user does not respond to said query, then:
   (b) to effectively prevent interaction between said first portable communications device and said electronic lockbox.

23. A method for operating an electronic lockbox system, said method comprising:
   (a) providing a plurality of electronic lockboxes, including a first electronic lockbox of said plurality of electronic lockboxes, said first electronic lockbox having a first processing circuit, a first memory circuit, and a secure compartment having a movable opening element that is under the control of said first processing circuit;
   (b) providing at least one portable communications device, including a first portable communications device of said at least one portable communications device, said first portable communications device having a second processing circuit, a second memory circuit, a display, a data entry device, and a first WAN communications circuit for communicating with a wide area network; and
   (c) providing a central computer having a third processing circuit, a third memory circuit containing at least one database, and a second WAN communications circuit for communicating with said wide area network, wherein said at least one database includes a first database having a plurality of entries that record information about visits to at least one property in said electronic lockbox system;
   (d) sending login message information from said first portable communications device to said central computer;
   (e) at said central computer, determining if said login message information is correct, and if so, allowing a user of said first portable communications device to obtain access to predetermined portions of said at least one database;
   (f) upon request by said user, sending a history of at least one property visit at said plurality of electronic lockboxes involving said user, from said central computer to said first portable communications device, and displaying said history on said display of the first portable communications device;
   (g) allowing said user, by use of said data entry device of the first portable communications device, to select one of the property visits from said history of at least one property visit, and sending that selection to said central computer; and
   (h) sending relevant information about said selected property visit from said central computer to said first portable communications device.

24. The method of claim 23, wherein said user comprises one of:
   (a) a sales agent of said electronic lockbox system; and
   (b) a sales prospect.

25. An electronic lockbox system, said system comprising:
   (a) a plurality of electronic lockboxes, including a first electronic lockbox of said plurality of electronic lockboxes, said first electronic lockbox having a first processing circuit, a first memory circuit, and a secure compartment having a movable opening element that is under the control of said first processing circuit;
   (b) at least one portable communications device, including a first portable communications device of said at least one portable communications device, said first portable communications device having a second processing circuit, a second memory circuit, a display, a data entry device, and a first WAN communications circuit for communicating with a wide area network; and
   (c) a central computer having a third processing circuit, a third memory circuit containing at least one database, and a second WAN communications circuit for communicating with said wide area network, wherein said at least one database includes a first database having a plurality of entries that record information about visits to at least one property in said electronic lockbox system;
   wherein said first, second, and third processing circuits are configured:
   (d) to send login message information from said first portable communications device to said central computer;
   (e) at said central computer, to determine if said login message information is correct, and if so, to allow a user of said first portable communications device to obtain access to predetermined portions of said at least one database;

(f) upon request by said user, to send a history of at least one property visit at said plurality of electronic lockboxes involving said user, from said central computer to said first portable communications device, and to display said history on said display of the first portable communications device;

(g) to allow said user, by use of said data entry device of the first portable communications device, to select one of the property visits from said history of at least one property visit, and then to send that selection to said central computer; and (h) to send relevant information about said selected property visit from said central computer to said first portable communications device.

26. The system of claim 25, wherein said user comprises one of:

(a) a sales agent of said electronic lockbox system; and
(b) a sales prospect.

* * * * *